US012777130B2

(12) United States Patent
Dasher et al.

(10) Patent No.: US 12,777,130 B2
(45) Date of Patent: Oct. 27, 2026

(54) DYNAMIC PARTICIPANT ENGAGEMENT AND REPRESENTATION IN A VIDEO CONFERENCING ENVIRONMENT

(71) Applicant: Adeia Guides Inc., San Jose, CA (US)

(72) Inventors: Charles Dasher, Lawrenceville, GA (US); Reda Harb, Saint Petersburg, FL (US); Jean-Yves Couleaud, Mission Viejo, CA (US); Serhad Doken, Bryn Mawr, PA (US); Ning Xu, Irvine, CA (US); Aldis Sipolins, Brooklyn, NY (US); Zhiyun Li, Kenmore, WA (US); Tao Chen, Palo Alto, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 24 days.

(21) Appl. No.: 18/618,926

(22) Filed: Mar. 27, 2024

(65) Prior Publication Data

US 2025/0310477 A1 Oct. 2, 2025

(51) Int. Cl.
*H04N 7/15* (2006.01)
*G06F 3/01* (2006.01)

(52) U.S. Cl.
CPC ............. *H04N 7/152* (2013.01); *G06F 3/013* (2013.01)

(58) Field of Classification Search
CPC ................................ H04N 7/152; G06F 3/013
See application file for complete search history.

(56) References Cited

U.S. PATENT DOCUMENTS

2005/0099492 A1 * 5/2005 Orr ........................ H04N 7/147 348/E7.083
2023/0261894 A1 * 8/2023 Srivastava ..... G06Q 10/063114 709/204

OTHER PUBLICATIONS

"Facebook adds two new Portals to the family, including first portable version", Tech at Meta, Meta, Retrieved from URL: https://tech.facebook.com/reality-labs/2021/9/facebook-adds-two-new-portals-to-the-family-including-first-portable-version/, Sep. 21, 2021, 12 Pages.

* cited by examiner

*Primary Examiner* — Amal S Zenati
(74) *Attorney, Agent, or Firm* — HG Law LLP

(57) ABSTRACT

Systems and methods are provided for optimizing a user interface display in a video conferencing environment. In some embodiments, the systems and methods receive conference feeds for each of a plurality of participants in a video conference. In some embodiments, the systems determine, based on historical interaction data for one or more participants of the plurality of participants, an interaction score for the one or more participants of the plurality of participants. In some embodiments, the systems generate, based on the determined interaction score, a first arrangement of representations of the conference feeds in a user interface. In some embodiments, the systems provide for presentation in the user interface the first arrangement of the conference feeds.

20 Claims, 23 Drawing Sheets

DYNAMIC PARTICIPANT ENGAGEMENT AND REPRESENTATION IN A VIDEO CONFERENCING ENVIRONMENT

BACKGROUND

The present system is related to systems and techniques for optimizing a user interface display in a video conferencing environment.

SUMMARY

Many video conferences present an interface to users which display an arrangement of live feeds of the various participants of the video conference. In one approach, the arrangement is based on a given default arrangement, such as according to the order the participants entered the video conference, and remains unchanged throughout the conference. In one approach, systems highlight live feeds of one or more participants in given circumstances, such as when a participant is speaking. In this approach, highlighting may be generating a distinguishable border around a participant's live feed or enlarging the feed. The existing approaches may result in an interface that appears disconnected from the content of the video conference. For example, the interface may scatter participants engaged in a conversation, leaving the user to dart from one part, or one page, of the layout to another to follow the conversation. In another example, the arrangement of the interface relative to a user's camera may create an impression that a user is not making eye contact or otherwise engaging with other participants. For example, if a user's camera is offset from the video conference interface, such as when an external camera is located to the side of a display, a user focusing on the video conference interface will appear to avoid eye contact with other participants because the user's eyes will look away from the camera. In another example, the arrangement may not align with a participant's gestures referencing a feed or presentation, again creating a need for the user to dart back and forth to locations on the screen. Such interfaces are missed opportunities for an optimized user interface that highlights cohesion and fluidity by mimicking signals and social cues typically expressed in natural conversation. Such interfaces may discourage interaction.

Accordingly, to overcome such problems, systems and methods are disclosed herein for improving interface displays in a video conferencing application. The video conferencing systems and methods include determining priority of video feeds among the plurality of video feeds in a video conference and positioning or repositioning representations of the prioritized feeds to maximize cohesion. Dynamic adjustment of each video conference participant's feed minimizes obstacles where feeds of customary conversationalists are positioned in ways that encumber participation and engagement with the video conference. For example, speakers involved in a conversation may be positioned side by side to focus activity in one portion of the display. In another example, when a participant references, by a comment or gesture, a feed, such as that showing a presentation or specific participant, the systems and methods may reposition or otherwise highlight the referenced feed to be easily visible. The video conferencing systems and methods may also include determining priority feeds from among the feeds in the video conference and determining a position, size, and crop of the prioritized feeds on the display that minimizes an eye gaze offset. In some instances, the video conferencing systems and methods include monitoring a live feed of a participant on a video conference and, upon detecting an undesirable action or decrease in bandwidth, smoothly transitioning the live feed of the participant to an alternative representation of the participant such as an avatar or pre-recorded loopable video. This replacement of the feed prevents users receiving a representation of the participant's feed from becoming distracted by unusual activity on the interface.

DETAILED DESCRIPTION OF THE DRAWINGS

The disclosed invention is directed to a system and method for optimizing a user interface to communicate and facilitate active presence of participants in a video conferencing environment.

Figure 1:
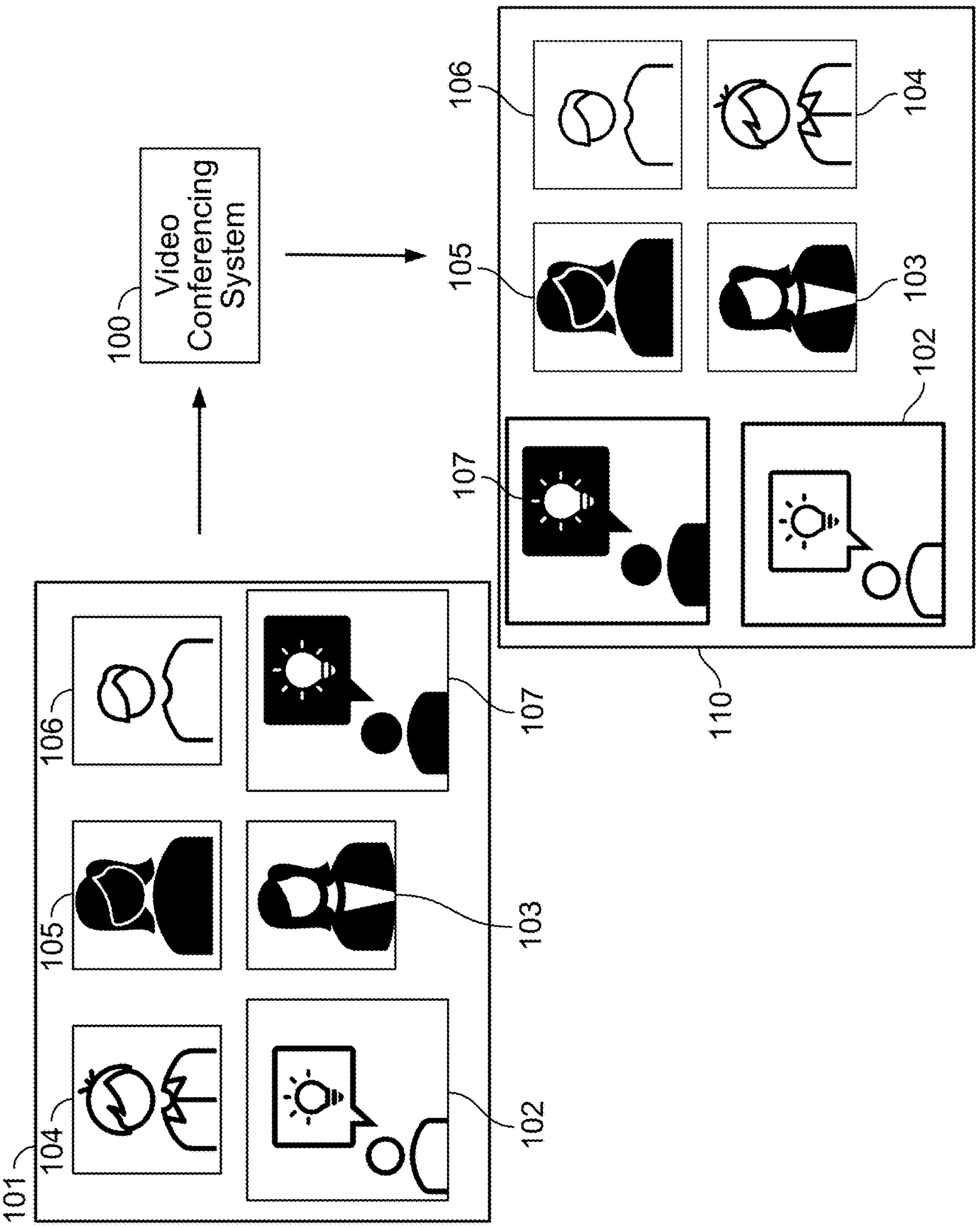
FIG. 1 shows an overview of an example video conferencing systems in accordance with the present description.

FIG. 1 illustrates the impact an example system and method of the present disclosure may have on a user interface. Interface 101 shows a video conferencing system without the present disclosure. The video conferencing system shown on interface 101 arranges thumbnails of the conference participants 102-107 arbitrarily or based on criterion such as the order in which the participants entered the conference. In some instances, a user may rearrange thumbnails him or herself. The interface 101 arranges thumbnails of participants regardless of the participants' behavior or statuses, for example, whether or not the participants are involved in a conversation. As shown, participants 102 and 107 are separated despite being involved in conversation. Interface 110 shows the video conference on an interface after the video conferencing system 100 has arranged the participants thumbnails of interface 101. Video conferencing system 100 considers the participants' behavior and other factors and has rearranged the thumbnails of the participants to place participants 102 and 107 adjacent to each other to mimic natural conversation and enhance user understanding. In interface 110 the speaker participants are directly on top of one another, but some embodiments may also place speaking participants next to each other. In some embodiments the arrangement is based on the type of a device displaying the interface or on a screen size of that device.

In some embodiments, the disclosed video conferencing system arranges the user interface to best accommodate interactions of participants on a video conference call. For instance, if two participants regularly engage in back-and-forth discussions in a weekly team meeting, the video conferencing system might, without input from a user, position the video feeds of the two participants to be adjacent to each other in subsequent sessions. This arrangement facilitates more natural and fluid interactions, closely mirroring the flow of in-person meetings.

In some embodiments, the system groups participants into distinct categories such as 'Participating,' meaning individuals who frequently engage in discussions, actively contribute to the meeting's content, or often respond to others. Another category might be, e.g., 'Non-participating,' or individuals who typically observe rather than actively engage in the discussions. Categories may also be based on external data. For example the video conferencing system may access data about the participants from third party systems that host such data. The data may include information such as an organization chart, titles, department, managers, direct reports, and more. As such, the system allows for customization based on specific meeting requirements or host preferences. This could include setting thresholds for what constitutes 'participating' and 'non-participating', or manually adjusting the layout as needed.

Figure 2:
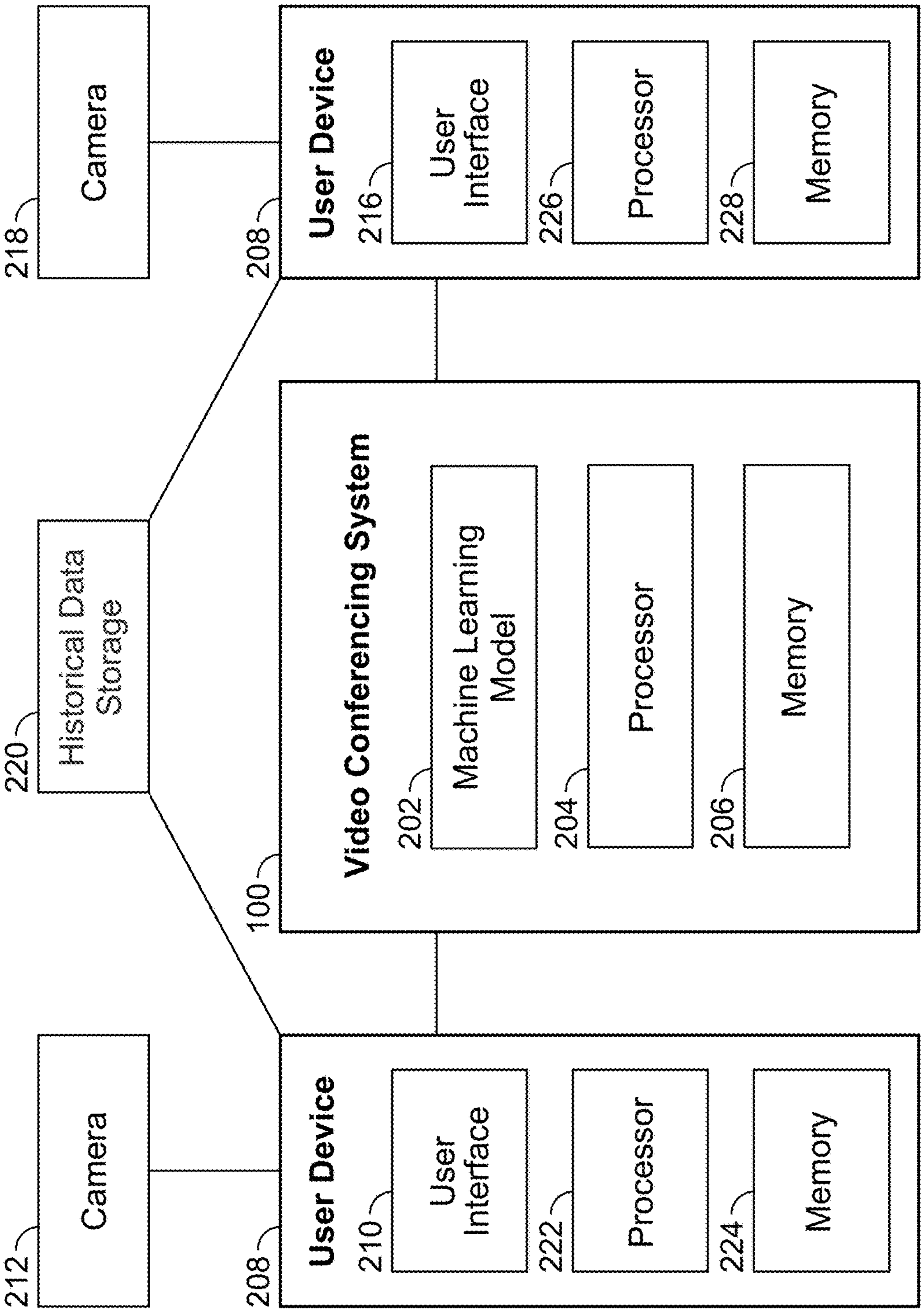
FIG. 2 shows an example architecture of the system of FIG. 1 in accordance with the present description.

FIG. 2 shows an example architecture of the system of FIG. 1. Video conferencing system 100 may include user devices 208 and 214, each including a user interface 210, 216, a processor 222, 226, and a memory 224, 228, respectively. User devices 208, 214 may be any device with video conferencing capabilities such as a laptop, smartphone, tablet, XR headset, or other devices. Processors 222, 226 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processors 222, 226 may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Processors 222, 226 may include communication circuitry, storage and processing circuitry. processors 222, 226 may be utilized to execute or perform any or all the systems, methods, processes, and outputs of one or more of FIGS. 1-25, or any combination of steps thereof.

In some embodiments, processors 222, 226 execute instructions for an application stored in memory. Specifically, processors 222, 226 may be instructed by an application to perform the functions discussed herein. In some embodiments, any action performed by processors 222, 226 may be based on instructions received from the application. For example, the application may be implemented as software or a set of and/or one or more executable instructions that may be stored in storage and executed by processors 222, 226. The application may be a client/server application where only a server application resides on a server.

In some embodiments, the video conferencing system determines a user interface arrangement based on stored historical interaction data. The historical data may include, for example, transcripts of video calls, speaking time of participants, connections between participants, voice identifications, and other information. For example, the video conferencing system may draw on data including past participation patterns, especially in recurring meetings, to inform user interface layout decisions and organize the display of dynamic participant representations. Past participation patterns might include, for example, information regarding which participants are most likely to be speaking, typical timing and duration of such discussions, and which participants a specific participant is likely to speak to.

In some embodiments, the video conferencing system uses a combination of machine learning techniques to analyze historical video conferencing data. For example, the video conferencing system may use Natural Language Processing (NLP) to interpret past conversations among a group of meeting participants to determine common conversation participants and combinations. The video conferencing system may also use deep learning models such as recurrent neural networks, long short-term memory networks (LSTMs) or Transformers based models to interpret language in a video conference. Using this information the video conferencing system may perform topic modeling and sentiment analysis on the spoken content of the meeting to derive further historical data. Within the ongoing conversations in the meeting, the video conferencing system may recognize individual participants using techniques such as convolutional neural networks or other deep learning approaches to classify which voice belongs to which participant. The video conferencing system may employ further machine learning techniques such as feature extraction to analyze tone, pitch and speech patterns to detect aspects of conversation such as emotions or questions. The video conferencing system may apply any combination of these technologies, or others known in the art, to determine a user interface arrangement.

In some embodiments, the video conferencing system may create a participation matrix based on historical data. The matrix might contain data such as participant-to-participant communication (person A spoke to or responded to person B), aggregate speaking time of a participant, percentage of speech determined to be questions or answers, etc. This data, or a subset of it in cases where only some participants are present in a different meeting, is utilized to calculate the likelihood of a participant's involvement in a meeting when they are with others they have previously interacted with. This data could be analyzed using unsupervised learning techniques, like clustering, to group similar interaction behaviors. The data, analysis, or a combination thereof, may inform the video conferencing system of an optimal interface layout. Following the analysis, the system dynamically arranges the user interface layout of participant representations in upcoming video conferencing sessions as users join, similar to interface 110. This arrangement is based on the identified interaction patterns of the participants. A notable aspect of this arrangement is positioning the video feeds of participants who are often involved in discussions close to each other. For example, if participants A and B are regularly engaged in discussions, their video feeds will be strategically placed next to each other in the subsequent session's layout. This placement may be adapted, changing in response to evolving interaction patterns as identified through a continuous analysis of historical data.

Figure 3:
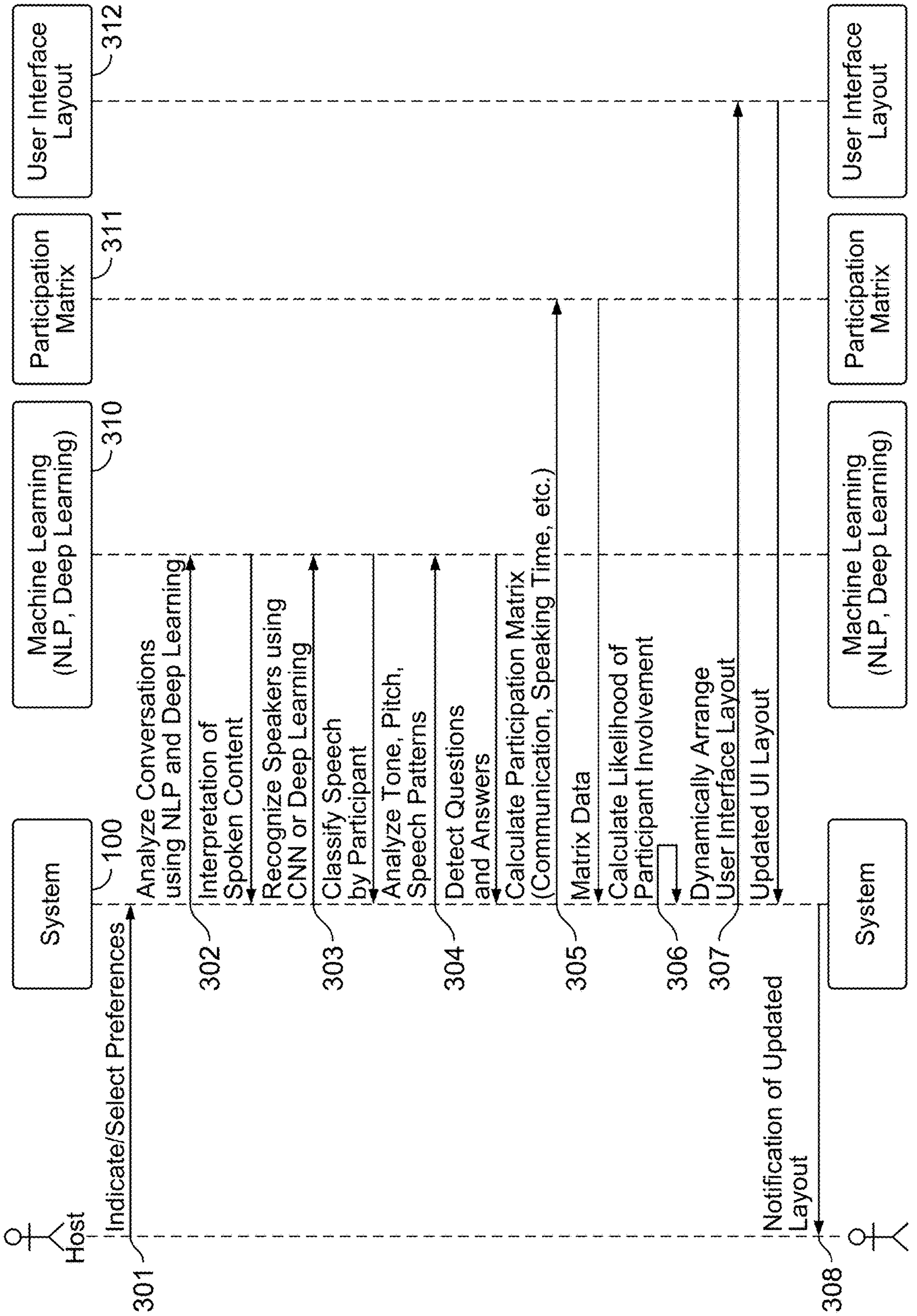
FIG. 3 shows an example process of the video conferencing system in accordance with the present description.

FIG. 3 outlines an example process of the video conferencing system according to the above disclosure. At first step 301 a video conferencing host transfers preferences, such as user preferences, to the video conferencing system 100. The video conferencing system 100 then communicates with machine learning model to analyze conversations using NLP and other deep learning models at step 302. These conversations may be past conversations, ongoing conversations, or others. In return, the machine learning model returns to the video conferencing system 100 an interpretation of the spoken content. The interpretations may include information described above, such as common speakers or topics. Similarly at step 303 the video conferencing system 100 communicates with machine learning model information regarding speaker recognition using convolutional neural networks and deep learning. In return, the machine learning software returns to the video conferencing system a classification of the speech by participant. The video conferencing system may also send speech to the machine learning model at step 304 for tone, pitch, and speech pattern analysis. In some embodiments the video conferencing at step 305 communicates with a participation matrix storage server to access the participation matrix data for incorporation into the video conferencing system for use in, for example, determining an arrangement of participants on a matrix. The video conferencing system at step 306 calculates the likelihood of each participants' involvement. At step 307 the video conferencing system 100 dynamically arranges the user interface layout, such as interface 110, through communication with the user device and the user interface thereon. Arranging the user interface may include bringing the video feeds or panels of common speakers closer on together enlarging those panels, or applying distinct video cues for emphasis. In some embodiments the video conferencing system notifies the host of the updated user interface layouts at step 308. As the conversation progresses and interaction dynamics evolve, the video conferencing system 100 continuously updates the user interface. This ensures that the user interface always reflects the current state of the conversation. Additionally, the system can incorporate individual user preferences or instructions from the meeting host, such as limiting the region available for group interaction highlights, regarding the layout arrangements, allowing for a tailored experience.

In some embodiments, the video conferencing system 100 analyzes ongoing conversations to identify which participants are actively engaged. Active engagement is determined by factors such as the frequency and duration of speech of a participant, the nature of the interactions, such as asking questions or responding to questions, and a participant's overall involvement in the discussion. Once active participants are identified, the video conferencing system 100 visually groups those participants together in the layout of the user interface. This grouping could mean bringing their video feeds closer together, enlarging their video windows, or applying distinct visual cues for emphasis. In some embodiments, the video conferencing system 100 displays a combination of active and non-active participants to prevent repetition or create diversity. For example, in a virtual classroom, active student speakers are likely to remain the same from class to class. Displaying a combination of active and non-active students ensures a variety of visible students. In such embodiments, a participant may be moved to a less prominent position when a level of participation or screen time exceeds a threshold. In some embodiments the variety of visible participants is based on demographic information which participants may self-identify. For example, in a virtual classroom an instructor may ensure that students from all backgrounds are visible by selecting to display a combination of participants.

In some embodiments, as the conversation progresses and interaction dynamics evolve, the video conferencing system 100 continuously updates the layout of the user interface. This ensures that the user interface always reflects the current state of the conversation. Additionally, the video conferencing system 100 can incorporate individual user preferences or instructions from the meeting host regarding the layout arrangements, allowing for a tailored experience. For example, one such preference might be limiting the region of the user interface available for group interaction highlights.

Figure 4:
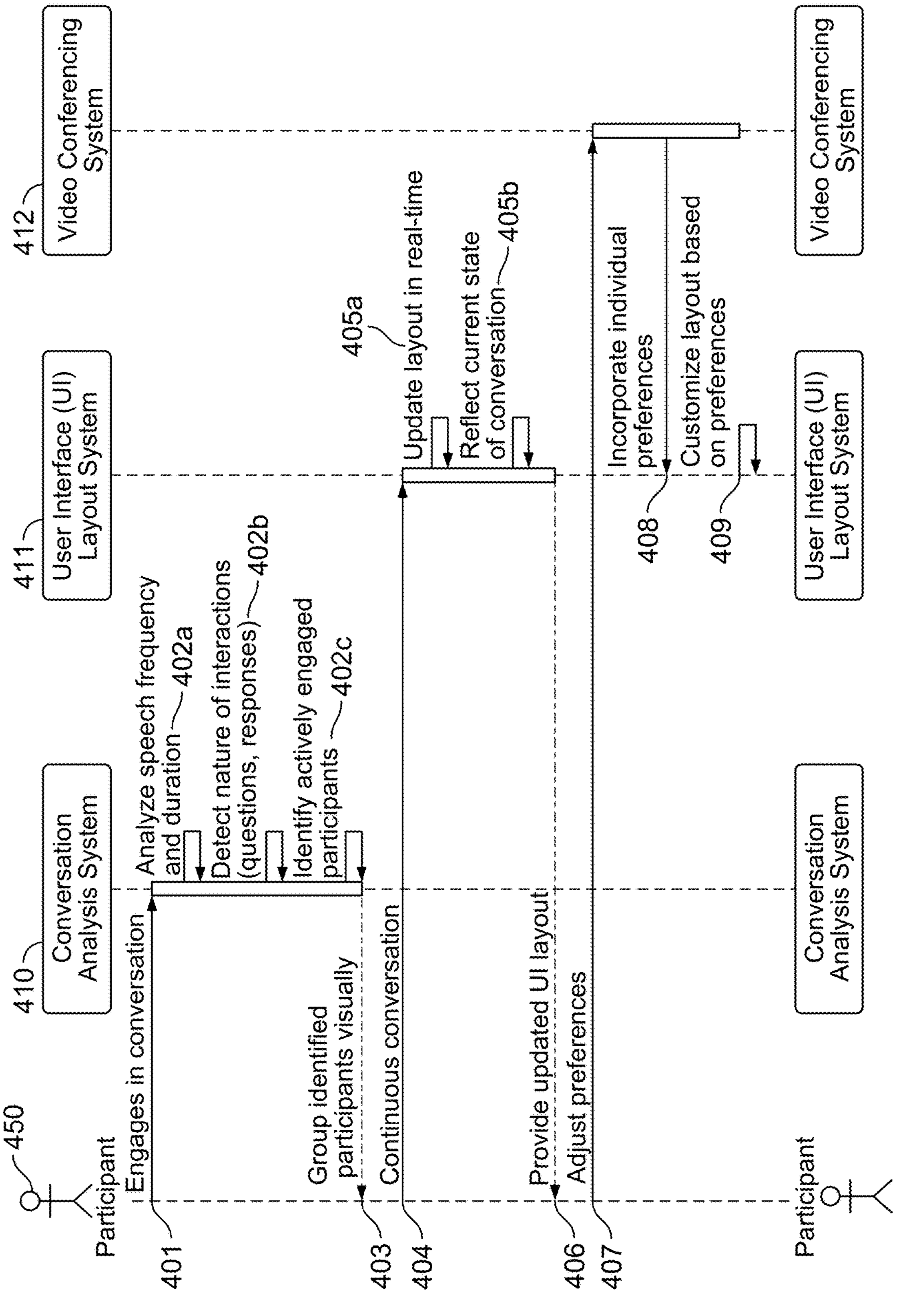
FIG. 4 shows an example method of video conferencing system customizing a user interface in accordance with the present description.

FIG. 4 illustrates an example method of video conferencing system 100 as it might customize a user interface for one participant. At step 401 a participant 450, via a user device, engages in conversation. The user device of participant 450 then transmits the dialogue to a conversation analysis system 410 which at step 402*a* analyzes speech frequency and duration, at step 402*b* detects the nature of the interaction including detecting questions and responses, and at step 402*c* identifies actively engaged participants. At step 403 the content analysis system sends a visual grouping of the participants in the video conference to the participant 450 via the user device. This grouping may be displayed on the interface of the user device of participant 450. At step 404 the participant 450 via the user device sends data regarding the ongoing conversation to a user interface layout system 411, which at step 405*a*, updates the layout of participants on user device of participant 450 and, at step 405*b*, reassess the current states of the conversation. In return, the user interface layout system sends an updated layout to participant 450 via the user device. At step 407 the user device of participant 450 sends adjusted preferences to the video conferencing system 412, akin to video conferencing system 100, which at step 408 incorporates the preferences into the user interface layout system 411. The user interface layout system then at step 409 customizes the layout based on the preferences. The video conferencing system 412 may then display the customized layout on the interface of the user device of participant 450.

In some embodiments, the system dynamically specifies identities of participants in a video conference through a machine learning model for enhanced participant identification. This feature is beneficial in situations in which, for example, two participants have the same name and therefore distinguishing between may present a challenge. For example, if two users have the same name, the system 100 performs a discrimination action by retrieving historical data in similar meetings so that when the name of a user needs to be highlighted in response to that user being named, the system 100 is able to correctly infer the relevant participant. The feature is further beneficial in a scenario where one participant mentions another, either by a name known to the system 100 or by another name. In such a scenario, the system 100 may recognize the participant and highlight or reposition the representation of the mentioned participant. For example, a video feed of a mentioned participant may be moved to prominent position or highlighted with a distinct border to allow other participants to quickly find the mentioned participant. As participants join the video conference, their names are captured and registered with the video conferencing system 100. This registration can occur automatically if the names are available through user accounts or meeting invitations. In cases where the platform does not pre-possess this information, a prompt for name registration upon joining may be provided or a user may be prompted to spell and speak their name. A machine learning system may preprocess entered names to match a format used in the training dataset. This preprocessing might include normalization steps like converting to lowercase, removing accents, etc.

Figure 5:
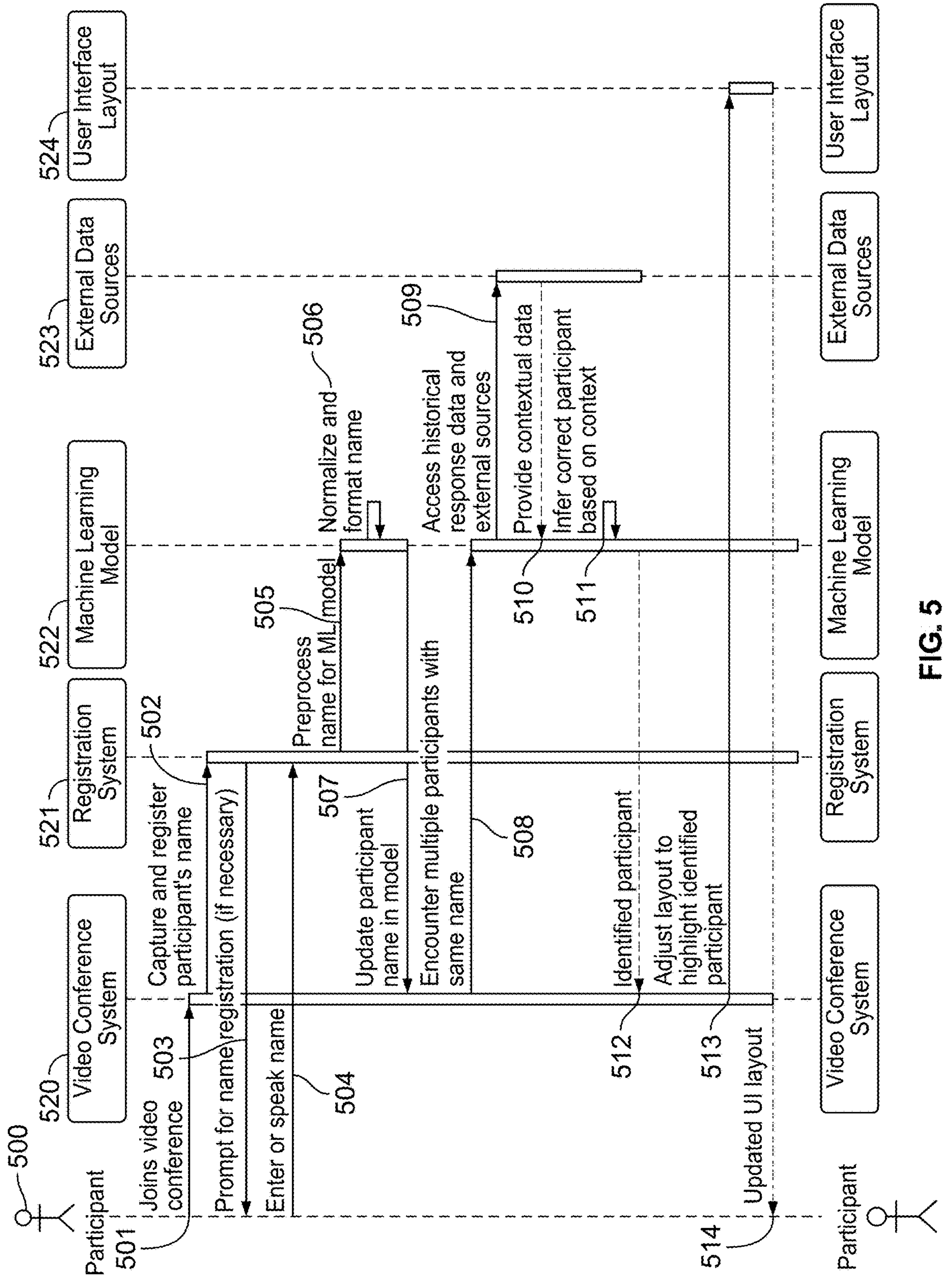
FIG. 5 shows an example method of video conferencing system for specifying the name of a participant in accordance with the present description.
Figure 6:
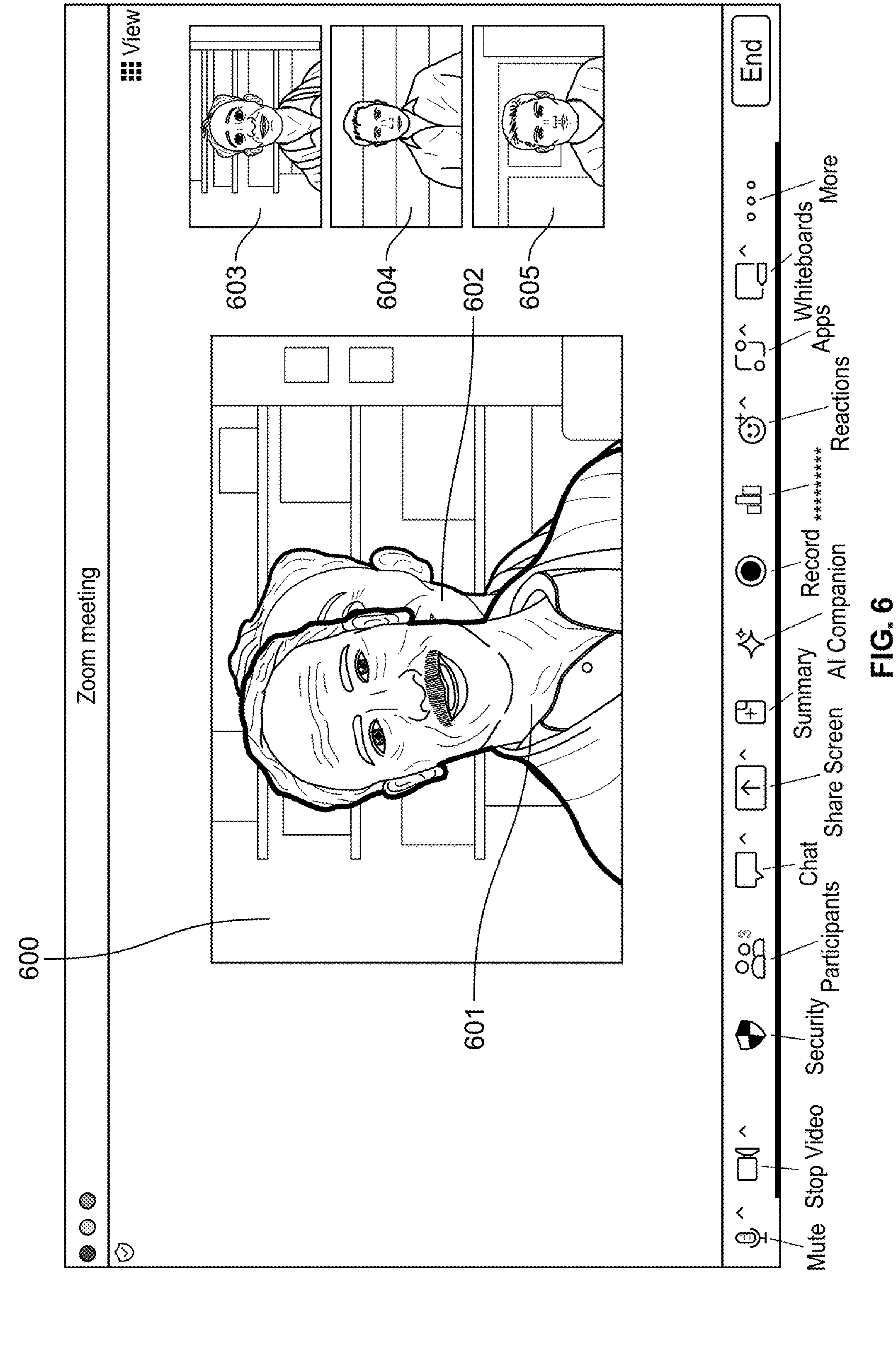
FIG. 6 shows an example avatar outline in accordance with the present description.

FIG. 5 shows a detailed method of the current disclosure for specifying a participant when two or more participants share a name. At step 501 participant 500 joins a video conference. Video conferencing system 520, akin to video conferencing system 100, then, at step 502, captures and registers the name of participant 500, as discussed above, and forwards that information to a registration system 521. The registration system 521 or video conferencing system 520 may in some embodiments, if necessary, prompt participant 500 for name registration, as shown at step 503. This step may take place in embodiments in which, for example, a participant has not provided a name. Prompting a participant for a name may include a request that a participant to speak his or her name at step 504. At step 505 the registration system 521, after receiving the name, preprocesses the name in anticipation of machine learning model 522 processing. This machine learning model 522 may also normalize and format the name at step 506. The video conferencing system 520 accordingly updates the name of participant 500 based on the machine learning model 522 processing. At step 507 The machine learning model may update the participant 500 name in the model. At step 508, the video conferencing system 520 may recognize that it has encountered multiple participants with the same name. In response, the video conferencing system 520 may then forward that information to a machine learning model 522. The machine learning model 522 may then access historical response data from external data sources 523 at step 509, which may then return contextual data at step 510. Historical data may include related data discussed above include frequency and duration of speech for example. It may further include information related to identifying participants. The machine learning model 522 may then at step 511 infer the correct participant based on the contextual data from step 510. At step 512 the machine learning model sends data indicating the identified participant to the video conferencing system 520. The video conferencing system 520 may then adjust a user interface layout 524 to highlight the identified participant at step 513. Finally, at step 514 the updated layout is sent to the participant 500, or another participant or viewer of the video conference.

The method disclosed in FIG. 5 enables the video conferencing system to identify a participant without relying on the name of the participant. This method may be applicable, for example, when two or more participants share one name or a participant uses a nickname. If a speaker or other user refers to one of the participants in a way that does not identify a particular participant, the method disclosed in FIG. 5 will determine and inform the video conferencing system of which participant the speaker or another user is referring to. The video conferencing system can then position, highlight, or otherwise signify the referred to participant without confusion. In some embodiments a speaker or other participant might mention an individual not on the video conference, and, as a result, the system 100 may identify this situation and indicate that the individual is absent.

In some embodiments, the user interface associated with system 100 can include a "Mentions" section which highlights the mentioned participant (e.g., displays an avatar, video thumbnail, etc.). In some embodiments, system 100 can treat the "Mentions" section as a participant as well, in the sense that the system 100 can route the feed associated with the mentioned entity, such as the feed of a mentioned a participant, to the thumbnail that is associated with the "Mentions" functionality. Similarly, the feed associated with the mentioned entity can be replicated such as it appears in the "Mentions" thumbnail as well as the thumbnail associated with the participant. The Mentions UI or thumbnail display feeds of certain participants for a predetermined period of time or until the natural language processing module has determined that the discussion is no longer about or specific to the originally mentioned entity. The "Mentions" functionality may rely on Named Entity Recognition that is part of Natural Language Processing algorithms. System 100 can be customized to detect entities for certain meetings or organizations, and can also rely on third party systems that include metadata about an organization's employees, such as HR Systems, Email system, etc.

In some embodiments the video conferencing system 100 further implements avatars or images to supplement a video representation of a participant on a user interface. For example a video feed of a participant may be replaced with the avatar or image at times when the participant is inactive. In some embodiments, the video conferencing system monitors a participant's live video feed to determine the position of the participant in a camera frame or the "silhouette" or outline of the participant within the live video feed frame. Such a silhouette is shown as element 601 in interface 600 of FIG. 6. The video conferencing system may make adjustments to the video feed of the participant based on the determined position. For example, the video conferencing system may move the avatar's position within the video frame, adjusting it to match the participant's position. This alignment is crucial for maintaining spatial consistency in the video conference layout when transitioning back and forth between a live video feed and an avatar. The alignment ensures that when a participant switches between a live video feed and an avatar, the position within the overall layout remains consistent, providing a seamless visual experience for other participants or viewers of the feed. An unaligned avatar silhouette is shown as element 602 in FIG. 6. As the video conferencing system 100 aligns the position of the avatar with that of the participant, it will converge the elements 601 and 602. Meanwhile, the feed of other participants, 603-605, remain unchanged.

Figure 7:
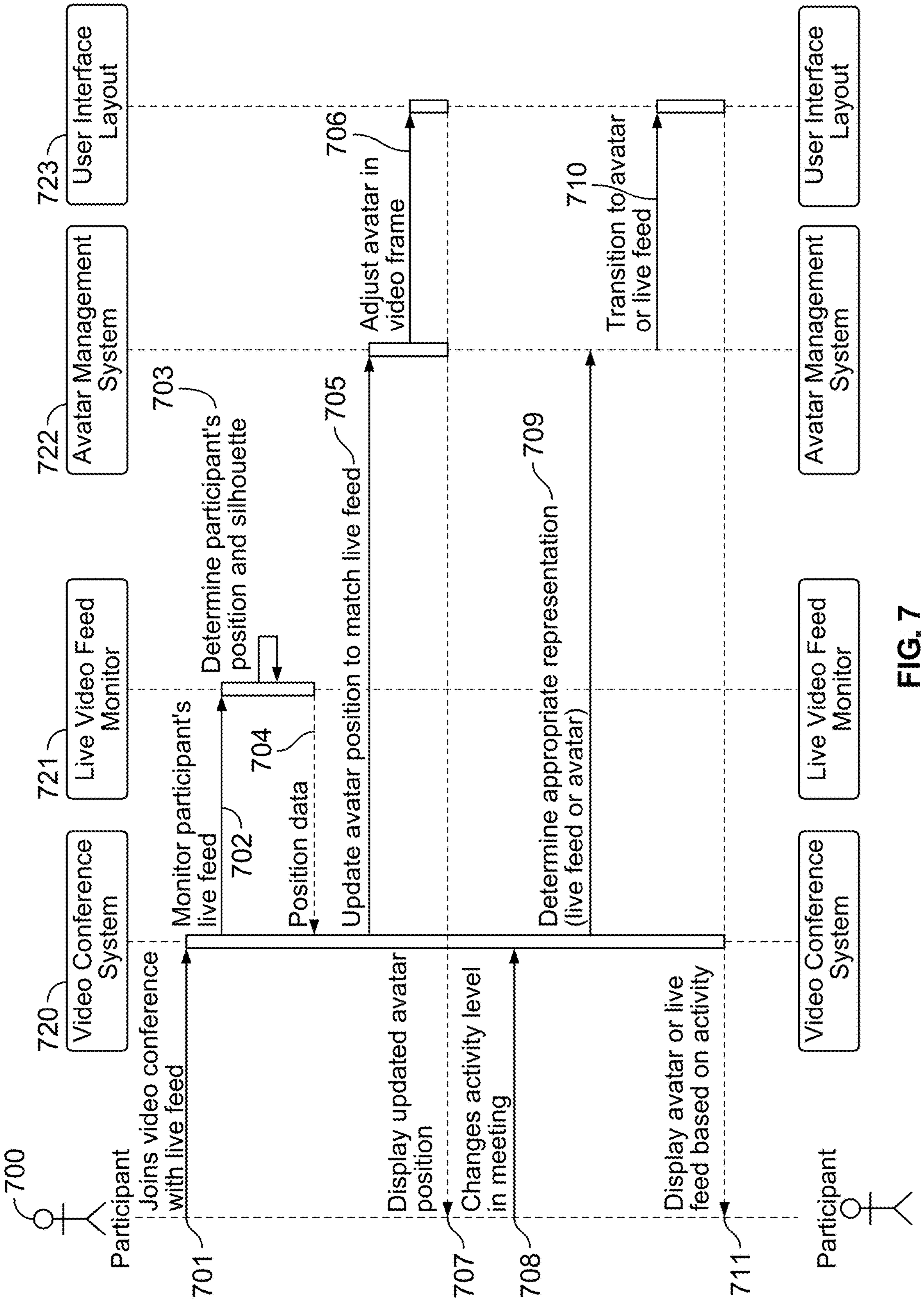
FIG. 7 shows an example method of video conferencing system adapting the avatar in accordance with the present description.

FIG. 7 is an illustration of the adaptive avatar process in accordance with some embodiments of the present disclosure. At first, step 701, a participant 700 joins a video conference. A video conferencing system 720, akin to video conferencing system 100 monitors the feed of the participants' live video from, for example, camera 212. At step 703 a live video feed monitor 721 determines the participant's position and silhouette based on images of the participant's feed. The live video feed monitor 721 may use image recognition software to identify a position and silhouette. At step 704 the live video feed monitor 721 sends the position data to the video conference system 720 for use in the avatar process. At step 705 the video conference system 720 updates the avatar position to match the position determined from the live feed. For example, the video conference system 720 may align the silhouette of the participant in the live feed with the silhouette of the avatar. At step 706 the avatar management system 722 adjusts the avatar in the video frame of user interface layout 723, which then at step 707 displays the avatar and updated avatar position to a participant or viewer of the video conference via a user device. At step 708 the participant 700 changes activity level. For example, a participant 700 may speak in the video conference. In another scenario, the participant 700 may perform an action he or she would prefer to hide, such as a yawn, drinking from a coffee cup, or standing up. In response to the change in activity, at step 709, the video conference system 720 determines the appropriate representation from either a live feed or an avatar. For example, if the user is participating in the conference, such as if the user is speaking, the live feed is preferred but if the user performs an action not related to the conference, for example if the user blows his nose, an avatar is preferred. At step 710 the avatar management system executes a transition according to the determination in step 709. The transition may be gradual, for example a fade out. At step 711 the user interface layout displays the updated feed to the participants or viewers of the video conference.

Figure 8:
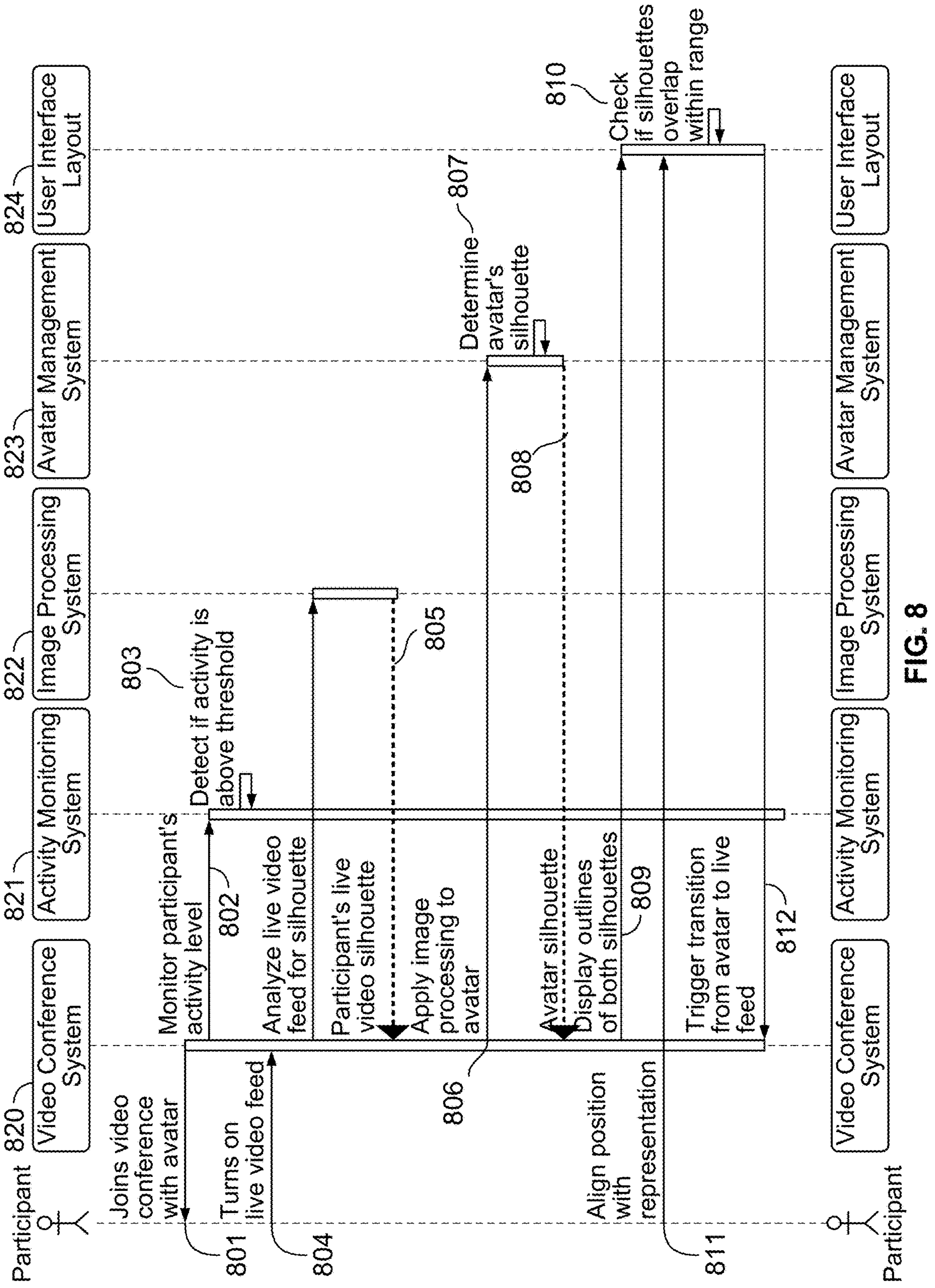
FIG. 8 shows an example process for monitoring avatars in accordance with the present description.

FIG. 8 shows an example process for monitoring avatars in accordance with one embodiment of the disclosure. At step 801 a participant joins the video conference using an avatar. At step 802 an activity monitoring system 821 monitors the participant's activity level using, for example, a live video feed of the participant, where the live feed may include audio and/or video information. At step 803 the activity monitoring system 821 detects if the participant's activity is above a threshold of movement or activity. For example, the activity monitoring system 821 may calculate a deviation in pixel outputs, range of movement, or a change in an average position. The threshold may be predetermined, calculated, or otherwise obtained. At step 804 the participant turns on his or her video feed, making it accessible to other participants of the video conference, and no longer relying on the avatar for representation during the video conference. At step 805 video conferencing system 820 sends the video feed to an image processing system 822 to determine a silhouette of the participant in the feed. The image processing system 822 returns the silhouette to the video conference system 820. At step 806 the video conferencing system 820 applies the image processing to the avatar in the avatar management system 823. This application may include aligning the avatar with the position of the participant in the live feed. At step 807 the avatar management system 823 determines the avatar's silhouette and at step 808 returns that information to the video conferencing system 820. At step 809 the video conferencing system 820 display the silhouettes of both the participant and the avatar on the user interface layout 824. At step 810 the user interface layout 824 determines if the silhouettes overlap within a predetermined range. At step 811 the video conferencing system 820 aligns the position of the avatar with the participant representation. At step 812 the user interface layout 824 triggers a transition from the avatar to the live feed of the participant.

Figure 9:
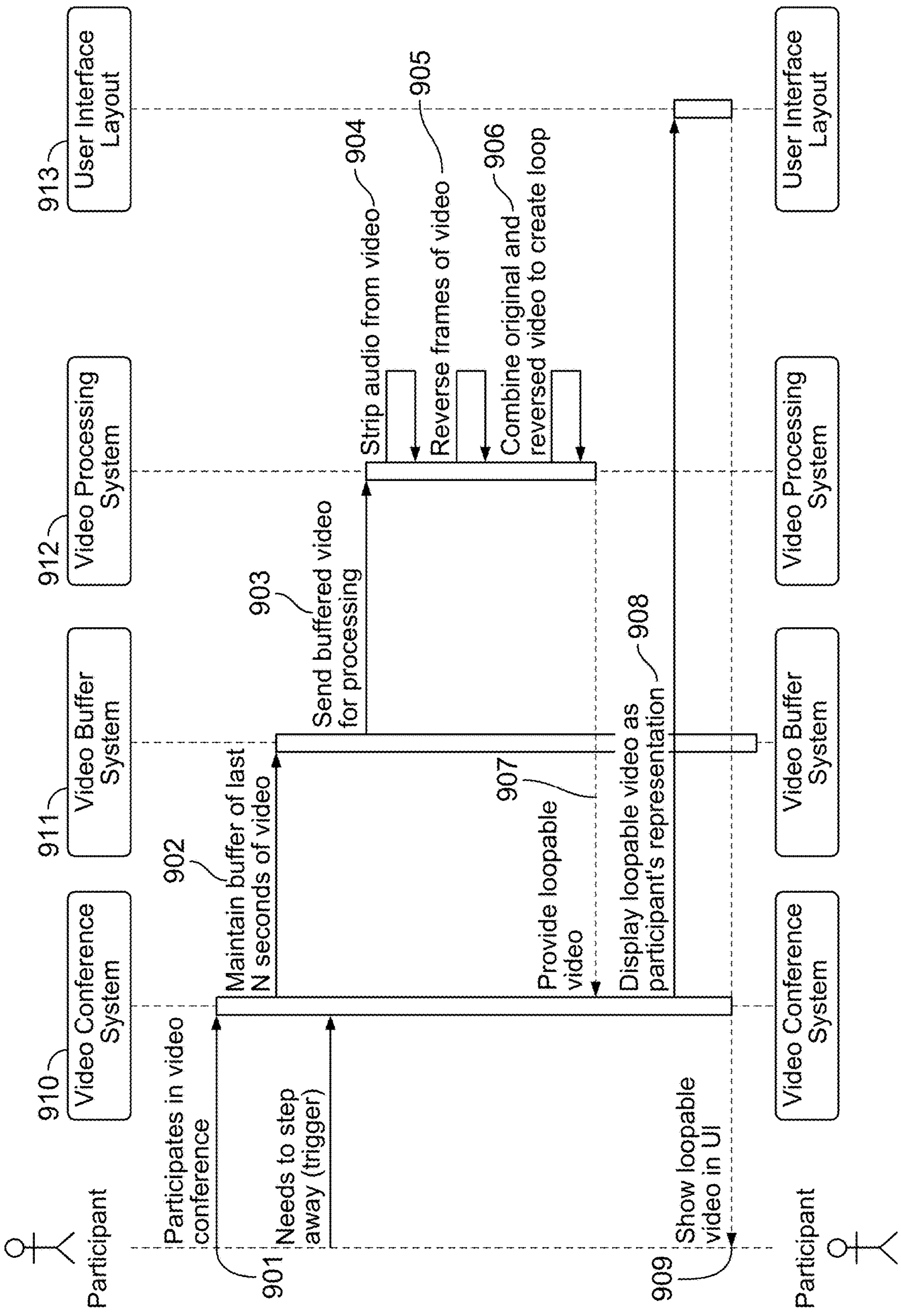
FIG. 9 shows an example process for creating a loopable video in accordance with the present description.

In some embodiments, the video conferencing system 100 may replace a live video with a recorded loopable video when a live feed of a participant is not preferred. In some embodiments the loopable video may replace an avatar option as both serve similar functions. FIG. 9 shows a process for creating a loopable video in accordance with some embodiments of the disclosure. At step 901 a participant participates in a video conference using video conference system 910. The video conference system 910 displays a live feed of the participant during the participant's participation. At step 902, the video buffer system 911 maintains a buffer of some seconds, such as the last N seconds, where N is a given number, of the video feed of the participant in the video conference. The number of seconds of video maintained in the buffer is variable among embodiments. It may be a number a particular system provides, based on a user selection, or adaptive to external factors, for example. The video conferencing system 910 may send the buffer of video to the video buffer system 911. At step 903 the video buffer system 911 sends the buffered video to a video processing system 912 for processing. The video processing system 912 may then strip audio from the video at step 904 to create a string of images, reverse the order of the frames of the string at step 905, and combine the original and reversed video, or string of images, to create a loop, or loopable video, at step 906. At step 907 the video processing system 912 provides the loopable video to the video conference system 910. The video conferencing system 910 at step 908 displays the loopable video in place of the participant's video feed in the video conference on a user interface layout 913. The loopable video is then the representation of the participant in the video conference. At step 909 the user interface layout 913 shows the loopable video in a user interface to a participant or viewer of the video conference.

Figure 10:
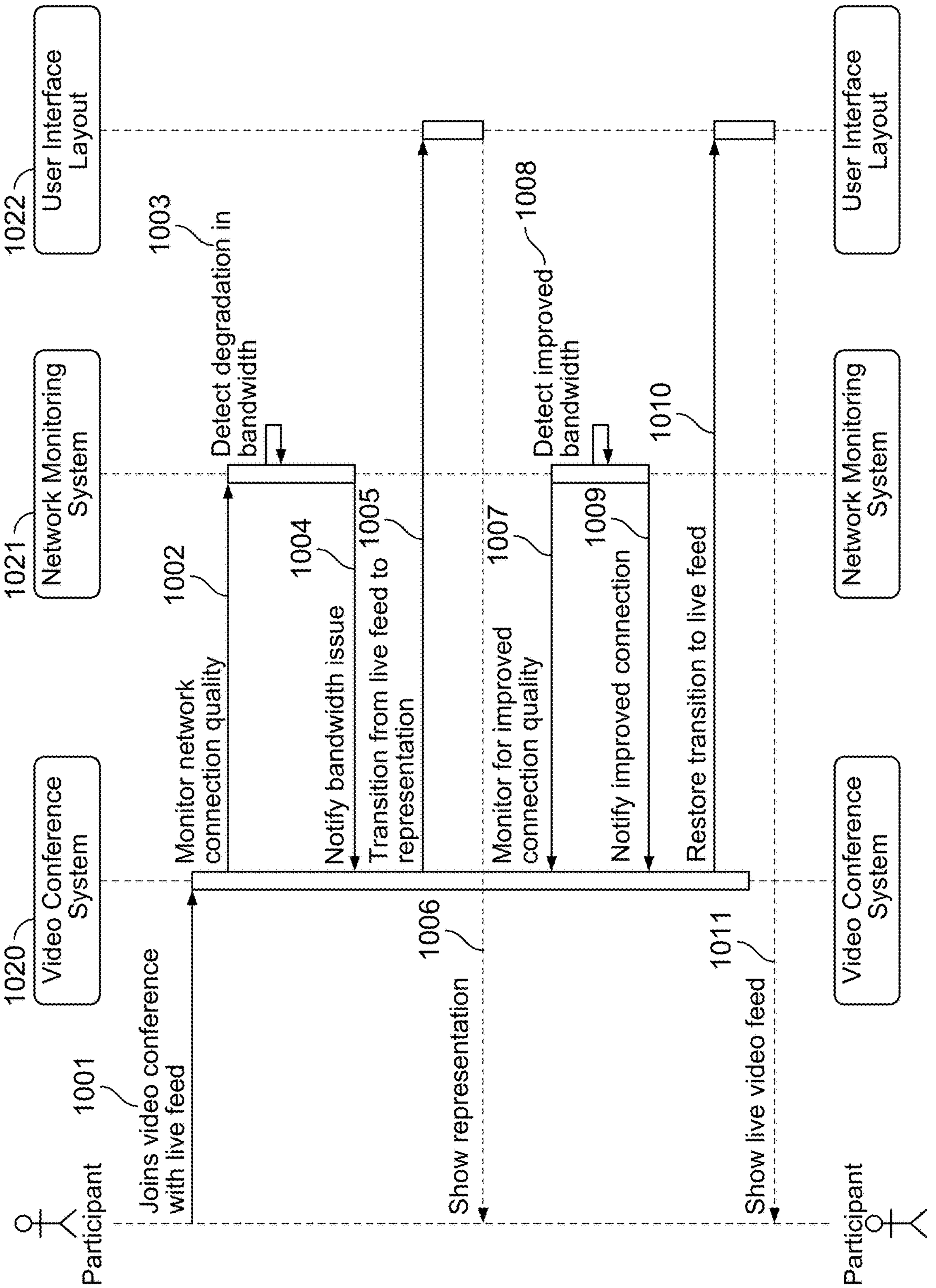
FIG. 10 shows an example process of managing a live feed according to available bandwidth in accordance with the present description.

The video conferencing system 100 may also replace a live feed of a participant with a locally stored video due to a decrease in bandwidth availability. In such scenarios a loopable video or other alternative representation may be created on a user device and stored in a manner that does not require additional transmission, such as within the memory of a user device. This alteration saves bandwidth and ensures a stable representation. FIG. 10 shows an example process of managing a live feed according to available bandwidth in accordance with one embodiment of the invention. At step 1001 a participant joins a video conference with a live feed. At step 1002 the video conferencing system 1020 monitors the network connection quality of the live feed using a network monitoring system 1021. The network monitoring system 1021 then at step 1003 detects a degradation in bandwidth and at step 1004 notifies the video conferencing system 1020 of the bandwidth degradation. At step 1005, the video conferencing system 1020 transitions, based on the bandwidth notification, from live feed of the participant to a representation of the participant on the user interface layout 1022. The user interface layout then at step 1006 displays the representation in a video conference through for example a display on a user device. The network monitoring system 1021 continues to monitor network connectivity for improved connection at step 1007. At step 1008 the network monitoring system 1021 detects improved bandwidth and at step 1009 notifies the video conferencing system 1020 of the improvement. In response, at step 1010 the video conferencing system 1020 restores the transition from the representation to the live feed of the participant and transmits the restoration to the user interface layout 1022 and at 1011 display the live feed in the video conference.

Figure 11:
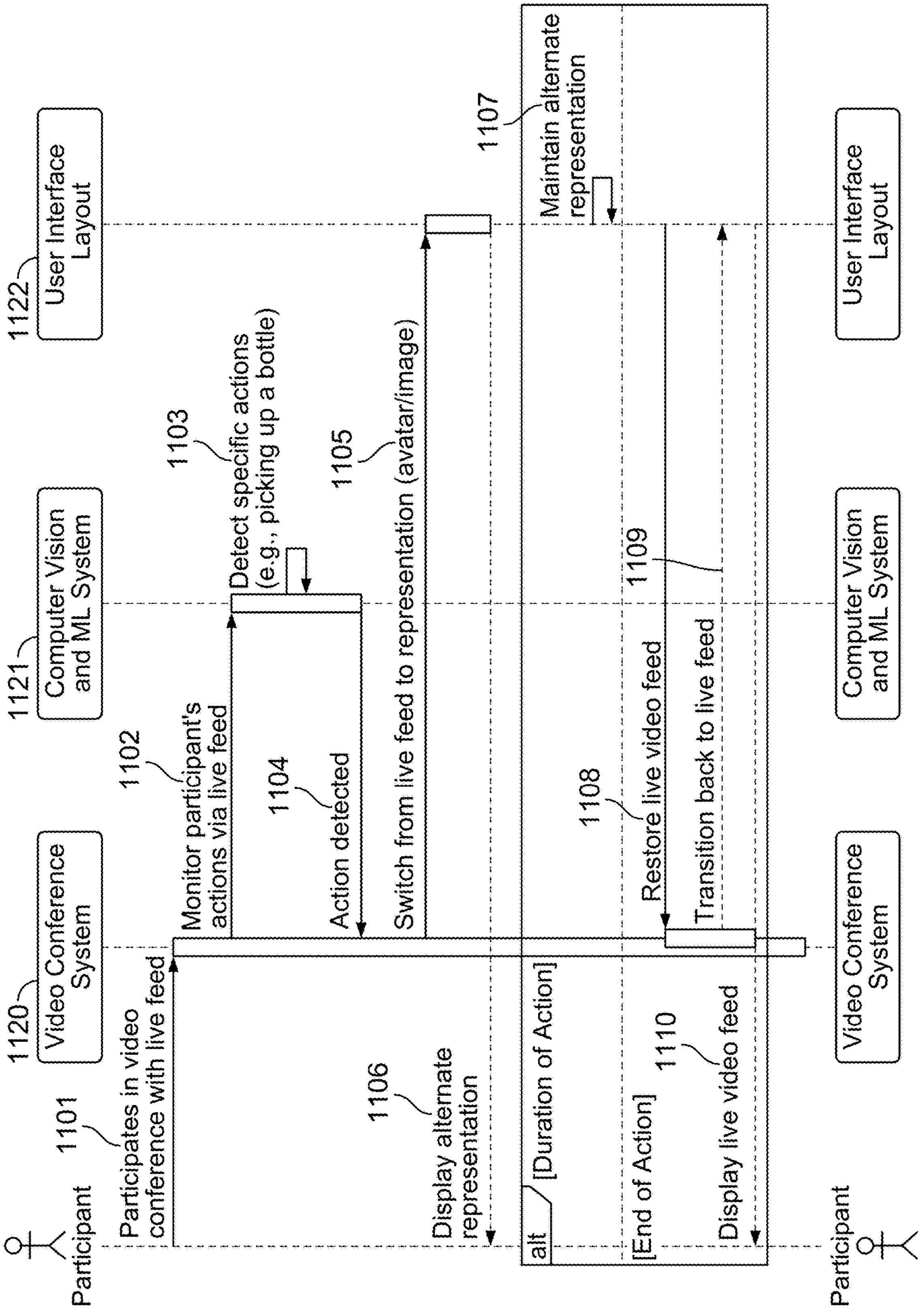
FIG. 11 shows a process of replacing a live feed with an alternative representation of a participant in accordance with the present description.

FIG. 11 shows a process of replacing a live feed with an alternative representation of a participant in accordance with one embodiment of the invention. At step 1101 a participant joins a video conference with a live feed. At step 1102 a computer vision and machine learning model 1121 monitors the participant actions via the live feed. The computer vision and machine learning model 1121 detects a specific action at step 1103 such as, for example, picking up a bottle. In some embodiments the computer vision and machine learning algorithm has been trained to determine actions based on video input. The computer vision and machine learning model 1121 reports the action to the video conferencing system 1120. At step 1105, in response to receiving a notification of the detected action, the video conferencing system 1120 switches the live feed of the participant to an alternative representation of the participant such as an avatar or loopable video. This switch from live feed to avatar prevents the live feed from showing an action. Such a switch may be desirable when the action is not commonly done in professional settings. This switch might apply to actions such as blowing the nose, drinking coffee, or standing up. The user interface layout 1122 at step 1106 displays the alternate representation to other participants or viewers of the video conference. The user interface layout 1122 then maintains the alternative representation at step 1107. At step 1108 the video conferencing system 1120 may restore the live video feed and transition from the alternative representation to the live video feed at step 1309. In some embodiments the restoration of the live video feed is after the video conference system 1120 monitors the live feed to determine that the live feed is preferred. The live feed may be preferred when, for example, the participant becomes active in the conference, such as when the participant speaks, or, in another example, if the participant has stopped the action for a designated amount of time. The user interface layout 1122 then displays the live video feed to the participant, other participants in the conference, or viewers of the conference at step 1110.

Figure 12:
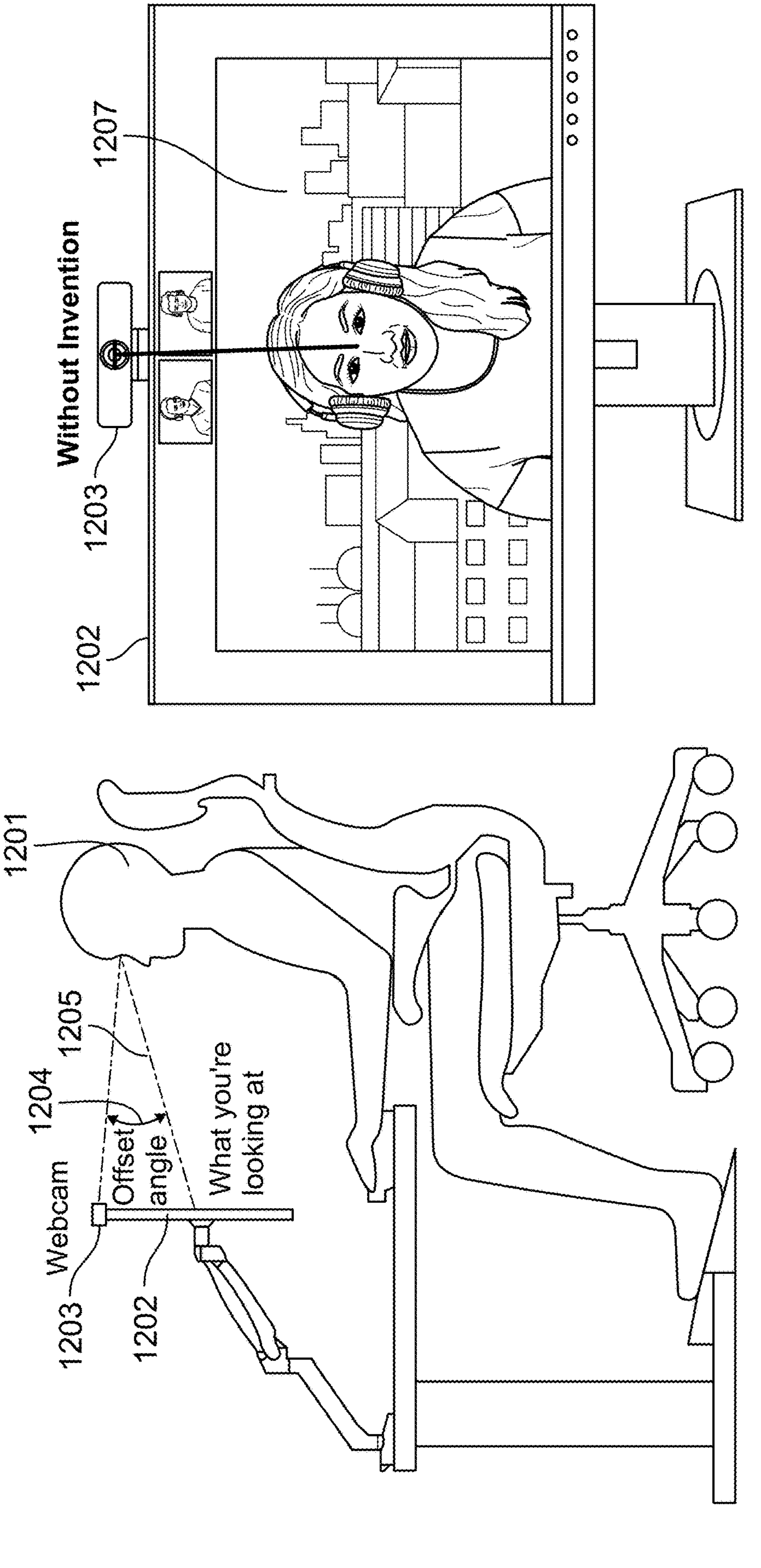
FIG. 12 shows an illustration of the origin of eye gaze offset in accordance with the present description.

In some embodiments the video conferencing system 100 may use the position of a participant's camera or the content of a panel to influence the display and panel arrangement. FIG. 12 illustrates eye gaze offset in one embodiment of the invention. A user 1201 sits in front of user device 1202 with attached camera 1203. Camera 1203 captures a view of the user 1201 at an angle 1206. The user 1201 views the display of user device 1202 at an angle 1205. Because the camera 1203 is not directly in front of the eyes of user 1201, there is an offset angle 1204 between the angle at which the camera 1203 captures the user 1201 and the angle of the eye gaze of the user 1205. Other participants interacting with user 1201 may perceive this offset, creating a disconnection between the user 1201 and other participants. User interface 1207 illustrates this offset for example as the eyes of the participant 1201 are not angled at the view but towards the bottom of the screen.

Figure 13B:
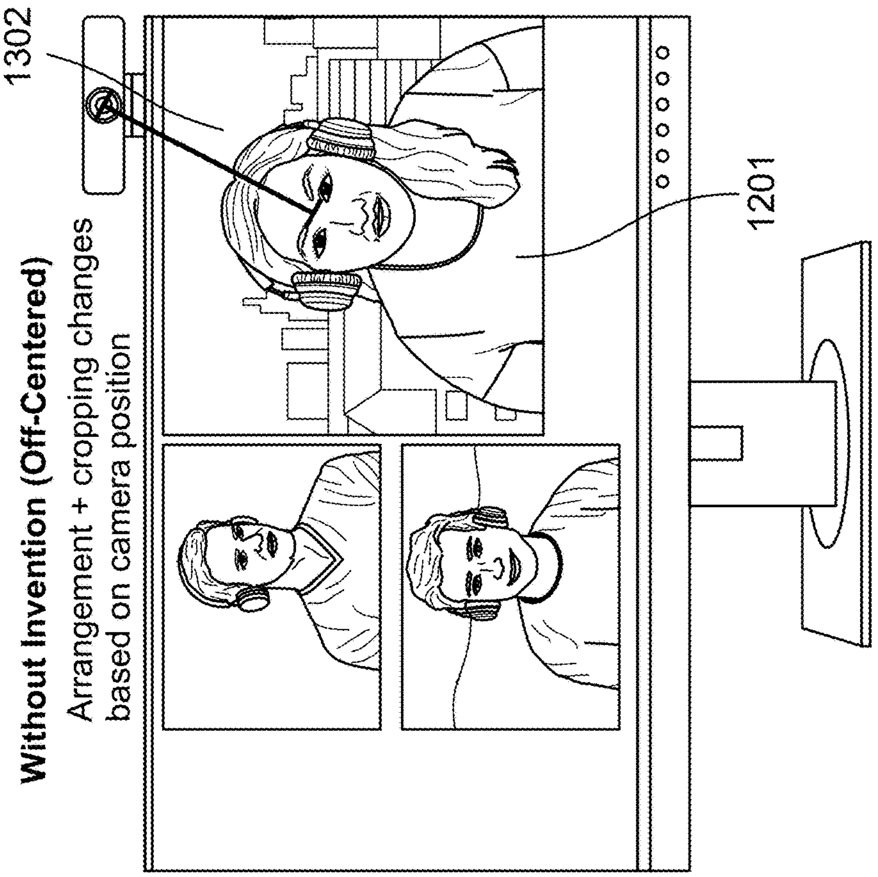
FIGS. 13*a* and 13*b* show an example display illustrating improvements of the present disclosure in accordance with the present description.
Figure 13A:
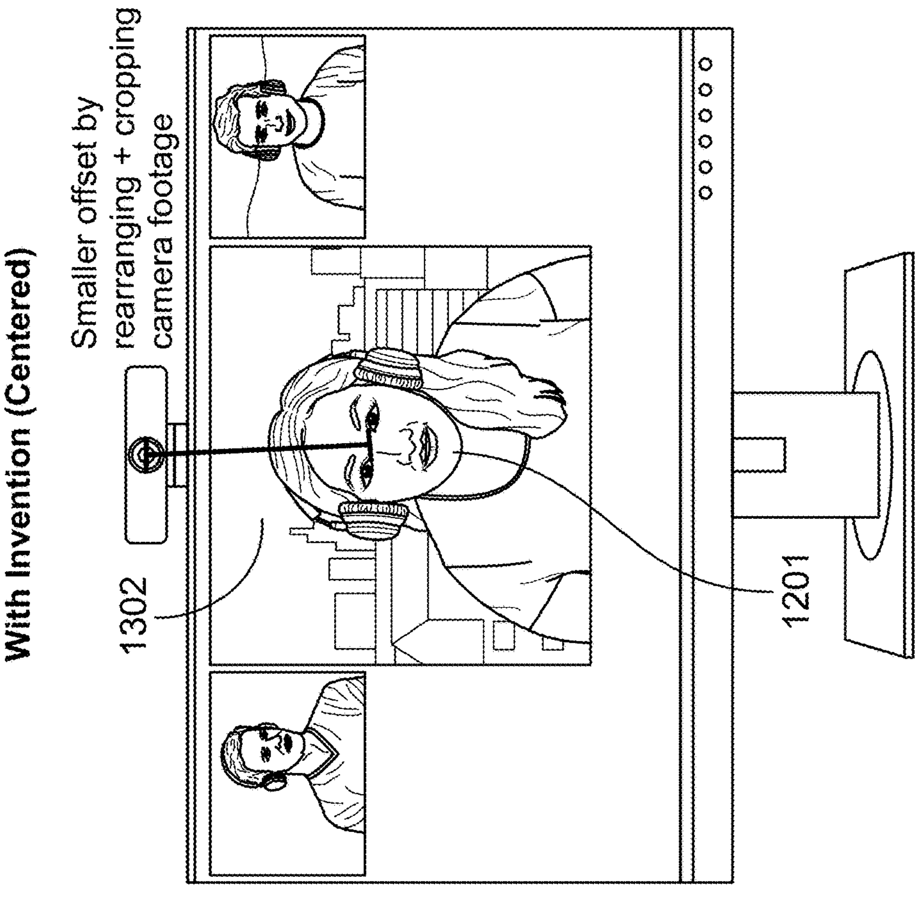

FIG. 13 illustrates the improvements of the present disclosure regarding the eye gaze offset. FIG. 13*a* shows the same user 1201 as in FIG. 12, shown in panel 1302. In FIG. 13*b* the video conferencing system 100 crops panel 1302 of the user and positions it to minimize the offset other participants perceive. In some embodiments, shown in FIG. 13*b*, the video conferencing system 100 positions the image 1302 of the user off center of the display such to further accommodate and disguise the eye gaze offset angle 1204.

Figure 14:
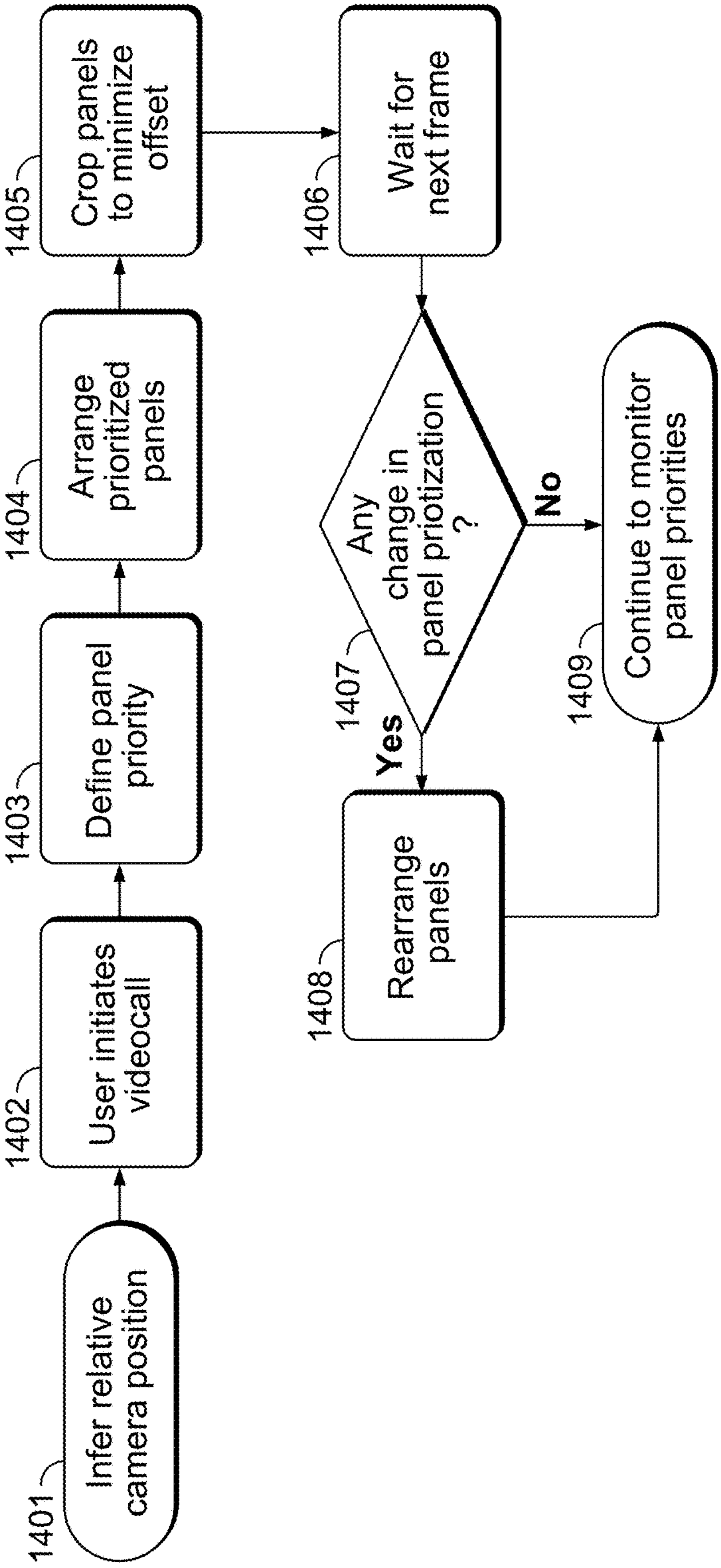
FIG. 14 shows an example method of arranging a participant's feed on a user interface to disguise an eye gaze offset angle in accordance with the present description.

FIG. 14 illustrates an example method of arranging a participant's feed on a user interface to disguise an eye gaze offset angle. At step 1401 the video conferencing 100 system first infers a relative camera position 1401 using for example image recognition software that analyzes the image of the participant such as user 1201. The inference may be based on either head gaze, that is, the direction in which the head points, or eye gaze. Head gaze may be inferred using existing human pose tracking models such as Apple's Vision framework, Microsoft's PoseNet, Google's OpenPose, or specialized human face tracking models such as OpenCV's DNN-based Face Detection. Other imaging methods such as time-of-flight sensors may provide supplemental pose information or may be selected instead of the data generated by the user's camera. Eye tracking may similarly be performed using a camera or supplemental sensors.

This step might also include a dedicated calibration stage. A dedicated calibration stage may present a fixation cross at the center of the screen and prompt users to point their head towards it, stare at it, or both. The video conferencing system 100 may prompt the user to press a button once they are focused on the right location, then run head/eye tracking for a predefined period. Calibration may similarly prompt the user to focus on a camera.

Once the video conferencing system 100 has collected head and/or eye gaze information for the display center and the camera, the system 100 may determine vertical, horizontal, and depth offset between the camera and display. The video conferencing system 100 may make this determination in a number of ways-depending on available data-such as, comparing vertical and horizontal eye angle for both positions, similarly comparing head/eye gaze angle if provided, or manually calculating head angle based on detected facial landmarks (e.g., nose, corners of eyes, corners of mouth) if head angle is not provided. If both head and eye tracking data are available, the system may prioritize or choose one exclusively based on differences in real-time accuracy estimates.

In some embodiments, a user also may manually select the camera position rather than use the automated system described above. This process may present an image of a monitor with a camera on top and allow the user to move the camera along horizontal, vertical, and depth axes. This process may also allow a user to manually enter their monitor size and aspect ratio and update the visualization in response. Dedicated calibration may present the user with images of their eyes captured at various points to let users select an acceptable amount of offset.

In some embodiments, rather than a dedicated calibration, the system may determine offset by automatically capturing relevant data during video conferences. For example, the video conferencing system 100 may process gaze similarly to dedicated calibration, with additional considerations. First, each video conference participant's panel may be segmented to identify that participant's face or eyes and capture the position of these features on the panel or display. Using this information, the video conferencing system 100 may calculate the pixel location where the participant's gaze hits the screen, then identify the nearest participant face. If eye tracking data is available, the video conferencing 100 may limit itself to fixation periods that last beyond a threshold when calculating eye gaze. The closest panel's participant face serves the same function as a fixation cross during calibration, but it lasts only until the participant's gaze moves away. Second, the system may analyze the participant's head/eye gaze to determine when they are looking directly at the camera. The video conferencing system 100 may use the resulting data to determine horizontal/vertical offset.

Figure 15:
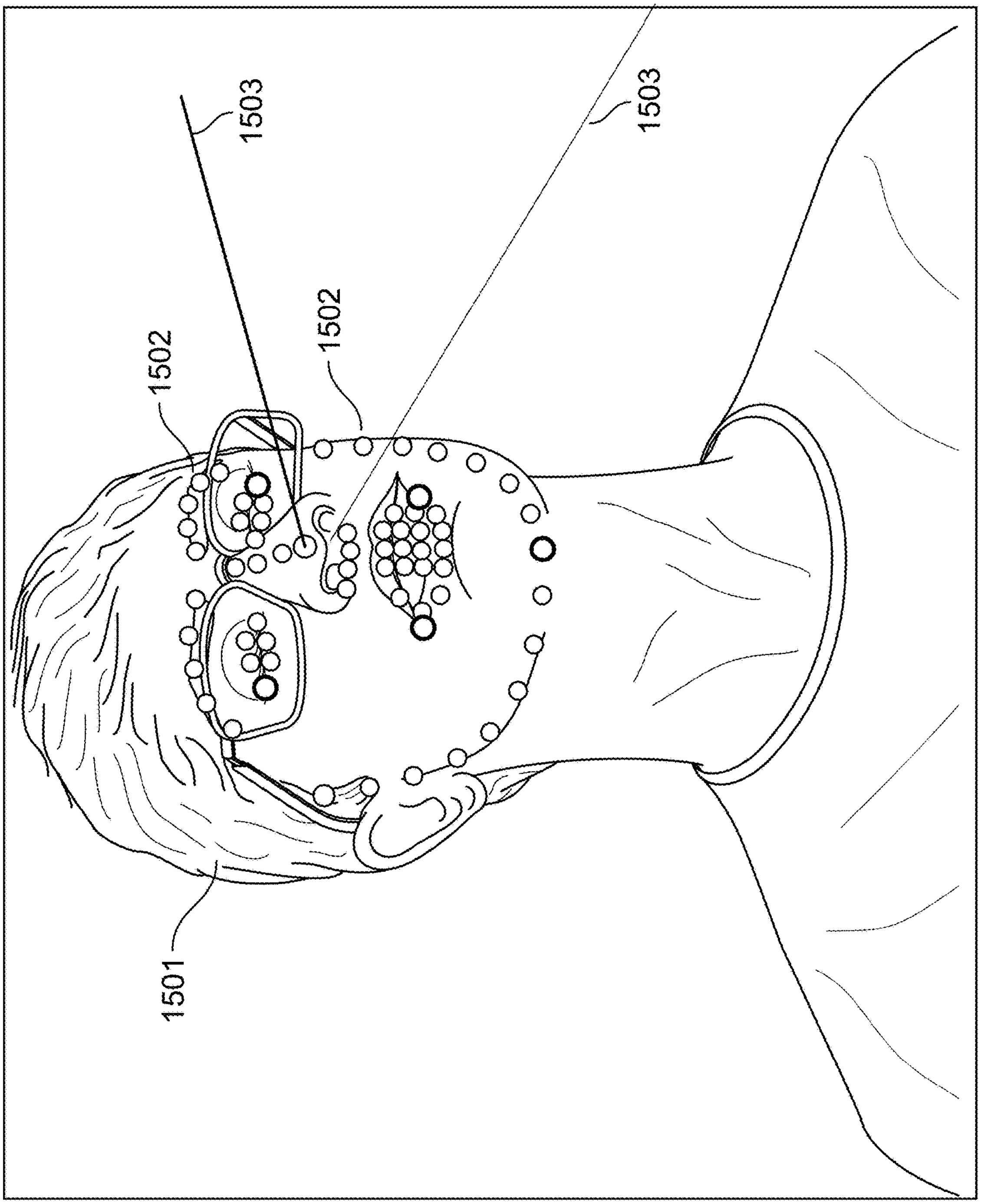
FIG. 15 shows an example determination of a computer vision algorithm in accordance with the present description.

FIG. 15 shows an illustration of an image recognition analysis of an image of user 1501 for the purpose of gaze detection. The image recognition model recognizes limitations of key facial features, such as end points of eyes, nose, lips, and jaw, and marks them with markers 1502. Based on markers 1502, the image recognition algorithm determines direction lines 1503 which from which it may extrapolate data indicating, for example, the direction the user 1201 faces, the eye gaze of user 1201 or the position of a camera 1203.

At step 1402 the user initiates a video call or video conference. In some embodiments step 1402 may occur before step 1401. The video conferencing system 100 then receives or determines panel priority information and defines panel priority accordingly at 1403. In determining panel priority, the video conferencing system 100 may in some embodiments consider, for example, a combination of frequency and duration of speaking time of the participant associated with the panel in the current and past video conferences, time passed since the last time the participant spoke in the current video conference, frequency and duration of interactions of the participant with the current speaker in the current and past video conferences.

The system 100 may prioritize specific features based on the amount and quality of available data or user-specified preferences. Such information may be available prior to a scheduled conference or at the start of an impromptu meeting. The relevant information may update as the call or conference progresses. In some embodiments, panel priority may be defined as a number between 0 and 1, with 1 indicating the highest possible priority, for example. Panels may be prioritized individually or as part of a group. In the case of a grouping of panels, a minimum priority difference threshold may determine the size of groupings. For example, if the highest priority panel has a priority value of 9 and the minimum priority difference threshold is 0.2, any panels with a priority value equal to or greater than 0.7 would be grouped together with it.

At step 1404 the video conferencing system 100 arranges prioritized panels on a user interface. The video conferencing system 100 in some embodiments selects the top priority panel, such as the panel with the highest priority value, and calculates potential offset for all potential panel positions (e.g., positioned on the left, right, or lower portions of a display). For each panel, offset refers to the distance between the participant's eyes and the inferred camera position, rather than, for example, panel center. The video conferencing system 100 then selects the position on the display with the least offset, positions the panel there, and, in some embodiments, repeats for every panel with priority above threshold.

The video conferencing system 100 may select dedicated regions on the display and the panel arrangement may accommodate the selection. This selection may be based on user preferences or other data such as a default setting. In some embodiments, a participant may set a radius defined by distance or visual eccentricity around their webcam. In some embodiments, a video conference panel would only be placed in dedicated regions if its offset is less than a threshold value. A user may indicate a minimum, maximum, or range of number of panels to be contained in each region. For example, a participant's panel may exceed threshold priority while the speaker is addressing or pointing at the participant and the priority may fall back below the threshold once the speaker moves on to a different focus. In this case, the prioritized panel may stay in its position if no other panels have exceeded the priority threshold. If a different panel has exceeded the priority threshold, the video conferencing system 100 may rearrange the panels, moving the participant's panel to a different panel location.

Then at step 1405 the video conferencing system 100 may crop a panel to minimize an eye gaze offset angle as described in FIG. 13. In some embodiments, the video conferencing system 100 may combine cropping with scaling and/or arrangement of the panels. In cropping panels, the video conferencing system 100 may perform segmentation on an image of a participant to identify the participant's outline and identify the closest or optimal crop without disturbing the participant's outline. Alternatively, the participant may select a minimum outline separation to leave space around his or her outline. The video conferencing system 100 then determines a focus of the crop, for example, any combination of vertical and horizontal positions, based on the inferred camera position. The video conferencing system 100 may update cropping in response to participant movement, keeping the participant centered and the outline undisturbed. If a participant's face takes up a relatively small portion of a feed, or small region of a display, the participant's panel may be cropped and scaled to enlarge their face. Panels may be similarly scaled up or down based on priority and arrangement of other panels.

The video conferencing system 100 then at step 1406 waits for the next frame of the participant and determines at step 1407 whether or not there has been a change in prioritization of the panels. If there is a change in prioritization, the video conferencing system 100 rearranges the panel at step 1408. If not, or if the video conferencing system 100 has already rearranged the panels, the video conferencing system 100 moves to step 1409 where it continues to monitor panel priorities and will potentially repeat the method if necessary.

In some embodiments the video conferencing system 100 monitors panel arrangement using data from eye tracking movement to influence priority. The video conferencing system 100 may also use eye tracking data to help a participant maintain eye tracking goals. Existing methods can determine which part of a display a user is looking at, which can be used to identify which panel a participant is looking at. By examining eye tracking patterns over time, the video conferencing system 100 may identify a non-speaking panel that the participant is interested in, even if that panel is otherwise a low priority, and elevate its priority level. Eye-gaze-derived interest may be calculated over the course of a video conference or within a given time period.

If a participant's goal is to make more natural eye contact in video conferences the participant may first define a goal (e.g., to make eye contact 20% of the time when someone is speaking). If a participant falls below the goal by a certain threshold, e.g., by a calculation in a sliding window of time, the video conferencing system 100 may prompt the participant to look at a prioritized panel. For example, for the prompt a light may flash around the camera location or a panel may grow or start vibrating to capture visual attention. Once the video conferencing system 100 detects eye contact (i.e., within the acceptable offset region), prompts may disappear immediately or fade out over time, either immediately or after the video conferencing system 100 detects a minimum duration of eye contact. The minimum duration of eye contact for each prompt may be influenced by the goal as well as progress towards that goal in the current video conference.

Figure 16:
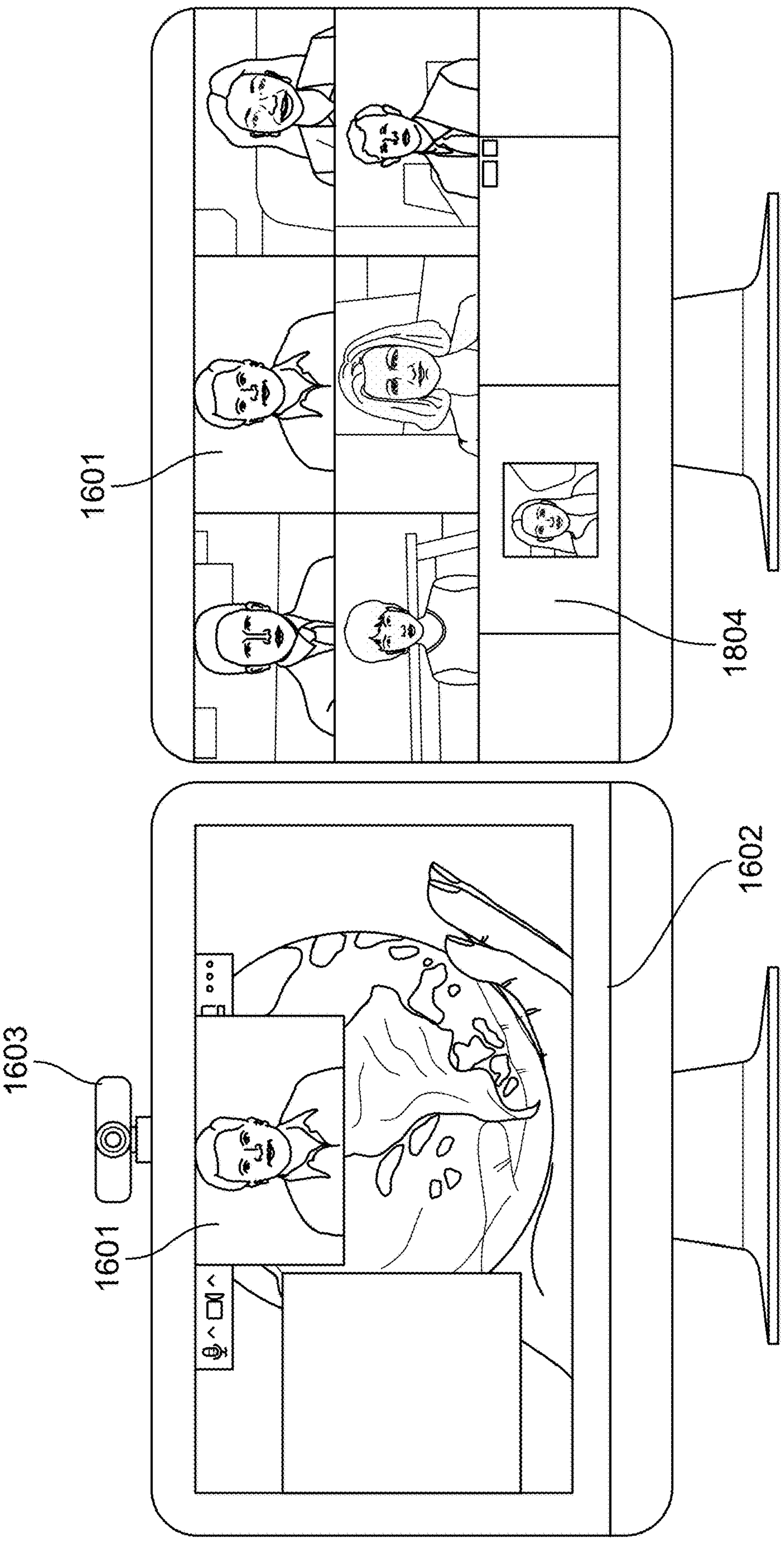
FIG. 16 shows an interface with an example overlay in accordance with the present description.

FIG. 16 shows an example overlay window 1601 positioned to encourage more frequent eye contact. In some embodiments an overlay window may appear near the detected camera position to enable more frequent eye contact while multitasking. The overlay window may appear on top of any application windows, freeing up screen space for other activities compared to rearranging panel windows within a typical video conference application 1604. The overlay window may appear or disappear or fade in and out in response to detected videocall activity, a change in panel priority, or on a timer. For example, an overlay window 1601 may appear at the top of a display 1602, closest to camera 1603. The overlay window 1601 may appear on top of any application windows, for example over the presentation "5 Easy Steps to World Domination," as seen in FIG. 16.

Figure 17:
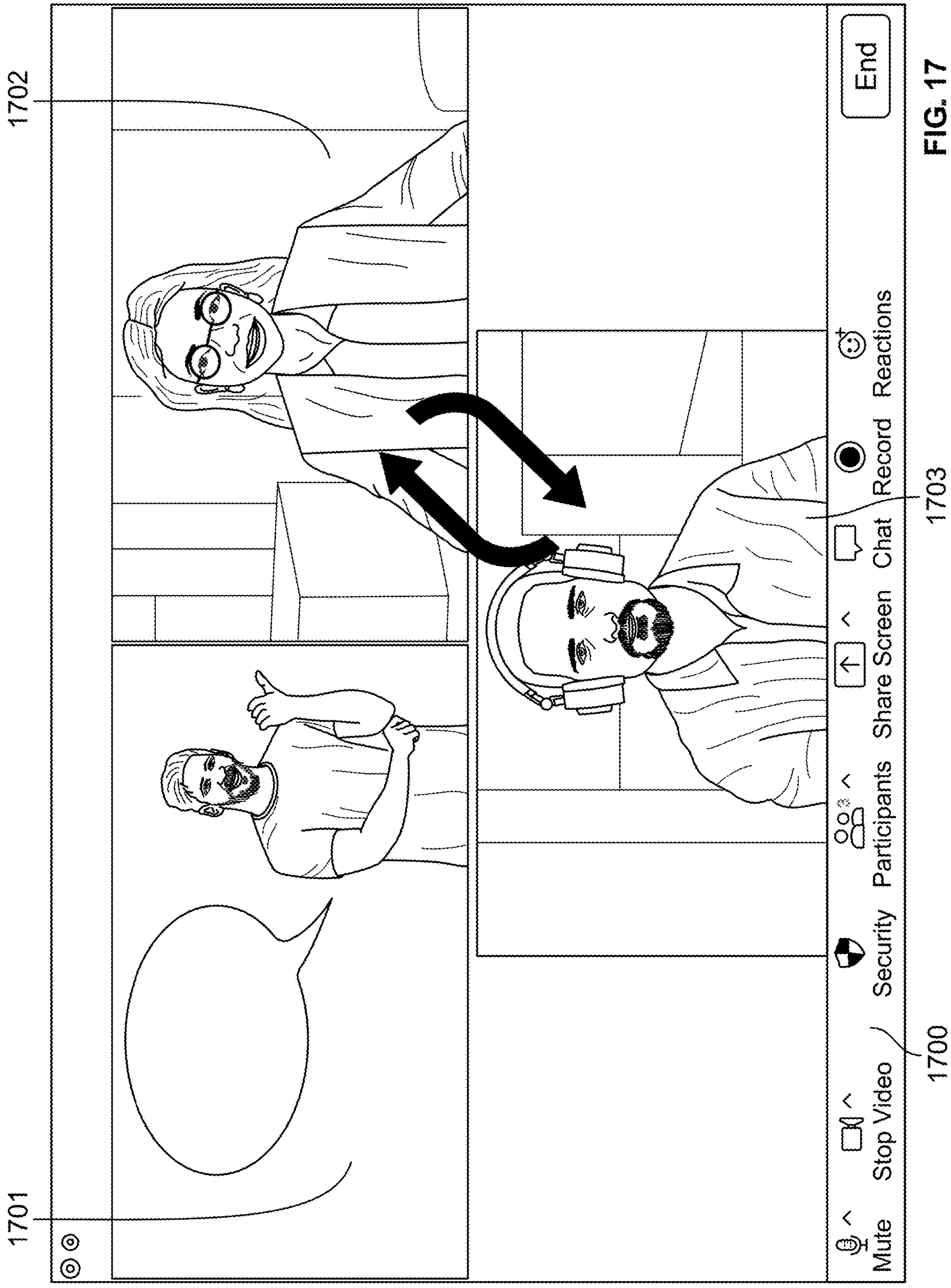
FIG. 17 shows an example interface that arranges video feeds based on gestures in a video conference in accordance with the present description.

FIG. 17 shows an example user interface display 1700 in which video conference participant panels 1701, 1702, and 1703 are based on interaction patterns including gestures. The video conferencing system 100 may determine a pose or gaze of a participant, using for example, APIs such as Google's Pose Detection or WebGazer. The video conferencing system 100 may analyze pose and gaze data to identify if a speaking participant is within a movement threshold indicative of a particular pose or action. Examples of significant poses or actions include, for example, pointing, gesturing, nodding, or other visual cues. The video conferencing system may also determine a direction in which the pose or gesture is intended. Verbal cues may similarly indicate a desired participant direction ("On my right I've got Jimmy. Below me is Jane"). In response to detecting a significant pose or gesture, the video conferencing system 100 may arrange participant panels such that the display shows the object of the gesture in the given direction. For example, in FIG. 17, the participant of panel 1701 points to the right on the screen, saying "Teresa's the best!" The video conferencing system may then position the panel of Teresa, panel 1702, adjacent and to the right of panel 1701.

Figure 18:
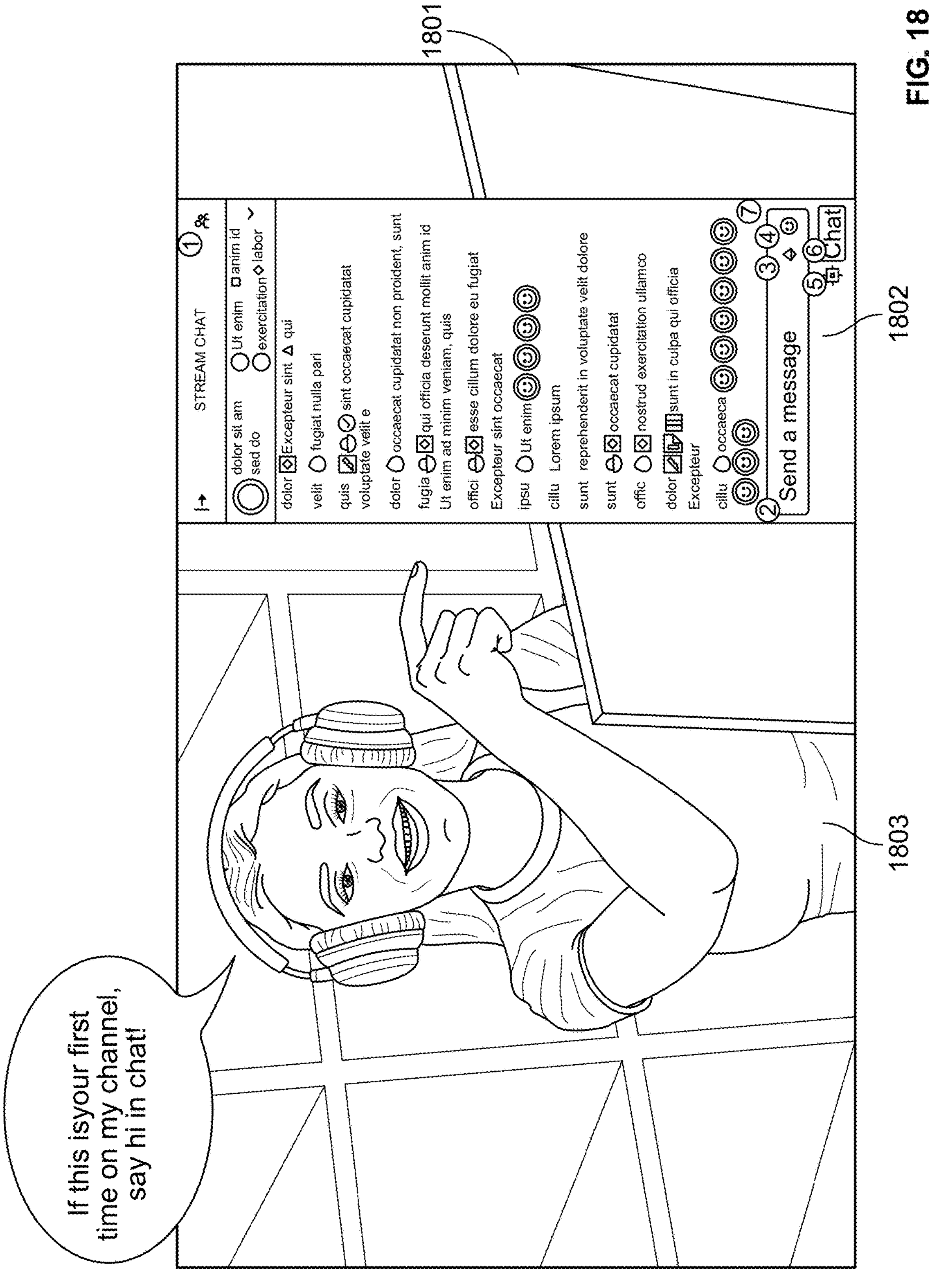
FIG. 18 shows an example interface that arranges video feeds based on gestures in a video stream in accordance with the present description.

FIG. 18 shows an example of an embodiment in which the video conferencing system 100 arranges an overlay 1802 according to a user's pose or gesture in a video stream or broadcast, rather than a video conference, in an interface 1801. In some embodiments, the overlay 1802 represents individual widgets (e.g., chat windows), which are separate from the video stream. A widget is configured to be repositioned on a screen as separate executable software with a separate user-interface. A user interface controller may receive instructions to move, resize, or apply animation to a widget from any module of the system 100, including the video analysis module and the NLP module.

The features of the video conferencing system 100 may apply to other scenarios which are not video conferences. Similar to the embodiment discussed above, the video conferencing system 100 receives a feed 1803 of the stream in which the user gestures to one side. Here, the user gestures to the screen's right. The video conferencing system 100 may analyze the feed 1803 as described above and determine that the user is referring, and pointing, to a chat feed. This analysis may include analyzing speech of the user saying, "if this is your first time on my channel, say hi in chat!" In response to the determination, the video conferencing system 100 arranges a chat overlay 1802 containing the feed to be adjacent to the user pointing toward the chat. The chat overlay 1802 may disappear when the user stops talking about it, stops pointing or looking at it, or both.

Figure 19:
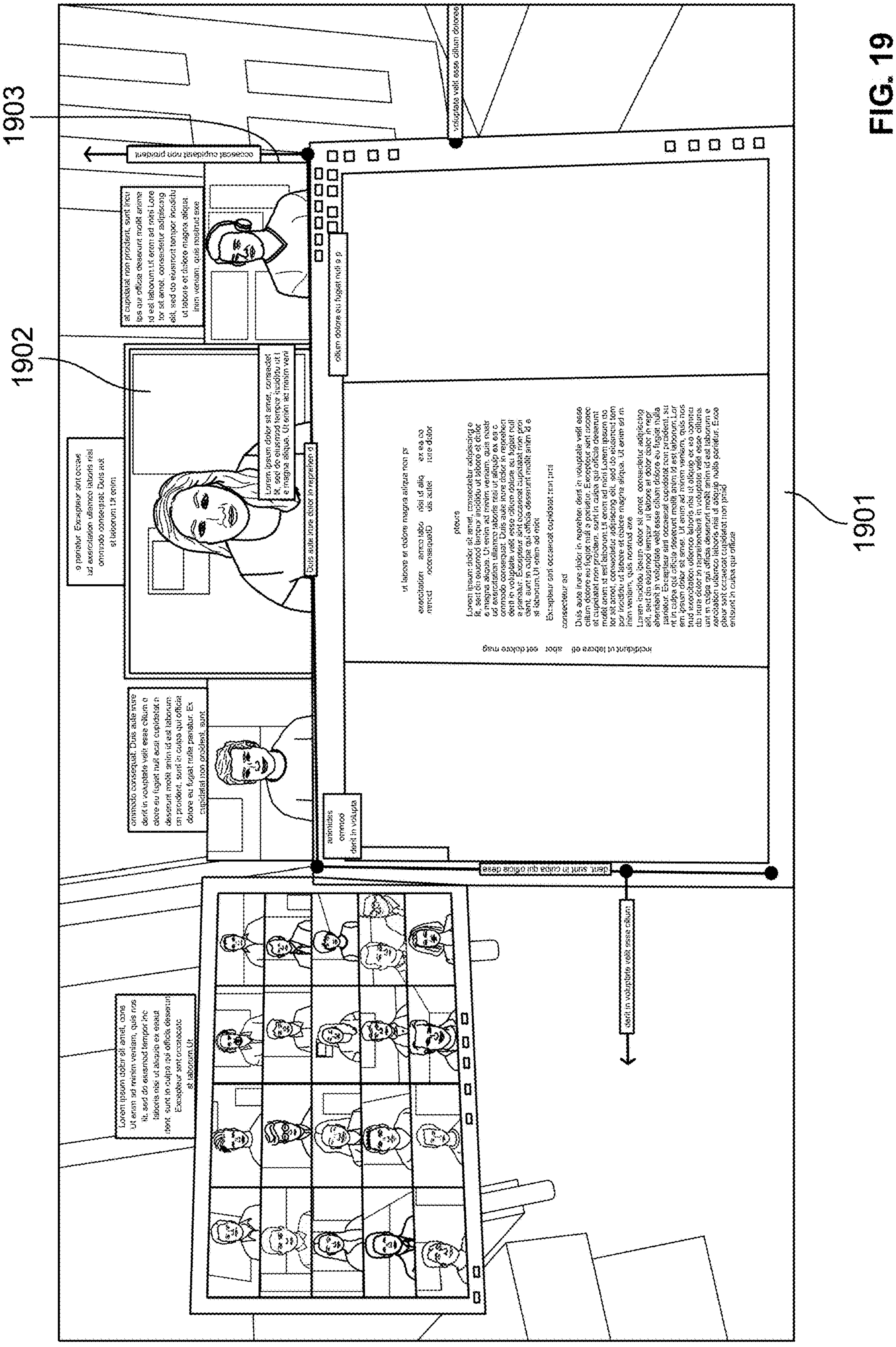
FIG. 19 shows an example interface in an XR environment in accordance with the present description.

In some embodiments the techniques described herein may apply to XR, such as virtual reality, augmented reality, or similar, video conferences. FIG. 19 shows a presenter sharing a full-screen program window 1901 on their laptop display while viewing high 1902 and low priority 1903 panels in augmented reality. This setup enables full-screen screen sharing on the laptop by moving low-priority panels (i.e., gallery view of silent watchers) adjacent to the physical display. Such a setup gives presenters more screen space for shared content while reducing offset. In this example, the video conferencing system 100 may generate spatial coordinates of the participant's camera. With the coordinates of the camera and the physical display for the meeting, the XR display window offset references will enable a system to perform the above embodiment.

A similar approach may be applied to VR to ensure that video conference panels and avatar representations are similarly placed close to a camera. In this case, the camera would be represented in the XR environment as an anchored (i.e., consistent) spatial location. Video conference participants may be represented as 2D video panels or 3D avatars, positioned to minimize offset and avoid obscuring high-priority content. Similar techniques may be applied in both examples.

Figure 20:
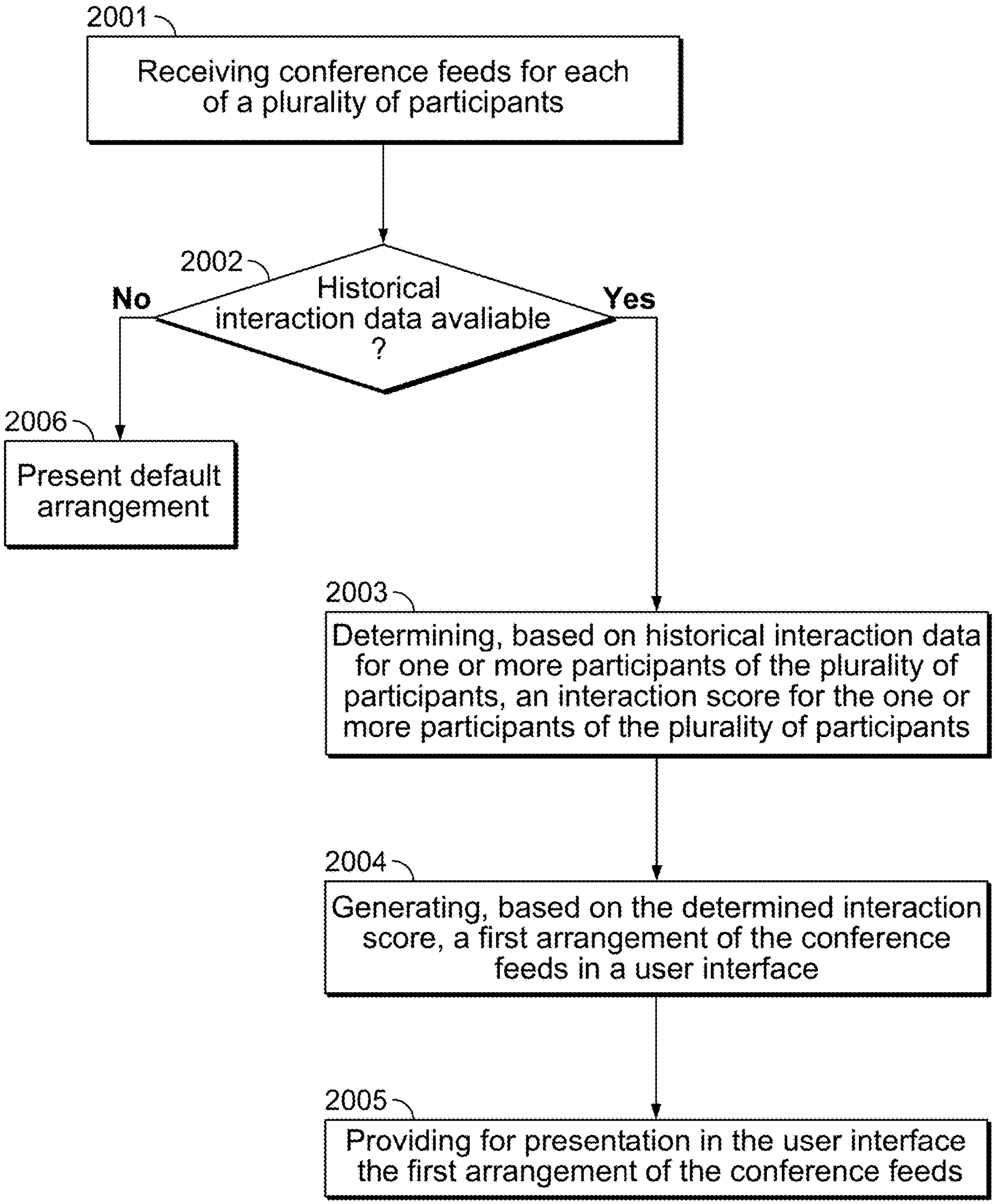
FIG. 20 shows an example process of the video conferencing system in accordance with the present description.

FIG. 20 shows an example process of one embodiment of the present disclosure. At step 2001 the video conferencing system 100 receives a conference via for each of a plurality of participants. A camera such as camera 212 attached to a user device 208 associated with each participant may capture the conference feed. The conference feed may include, audio, video, or a combination of the two. In some embodiments the feed includes an image of the participant. The user device 208 may process the feed via process 224, for example, prior to transferring the feed to the video conferencing system 100. The video conferencing system 100 may receive the feed via a communication network, such as the internet or intranet. At step 2002 the video conferencing system 100 may determine whether or not historical information data is available for the given conference feeds. The video conferencing system 100 may make this determination based on information received from the historical data storage 220. The video conferencing system 100 may also receive this information via a communication network. Historical data may include for example a participation matrix, or other data regarding a participant's typical participation. If no historical data is available the video conferencing system 100 may display the video conference using a given default arrangement at step 2006. If the video conferencing system 100 receives history interaction data, it may determine, based on that data, for one or more participants of the plurality of participants, an interaction score for the one or more participants of the plurality of participants at step 2003. At step 2004 the video conferencing system 100 generates, based on the determined interaction score, a first arrangement of the conferences feeds in a user interface. At step 2005, the video conferencing system 100 provides for presentation in the user interface the first arrangement of the conference feeds. Users or participants of the video conference then receive the feeds arranged according to the interaction scores.

Figure 21:
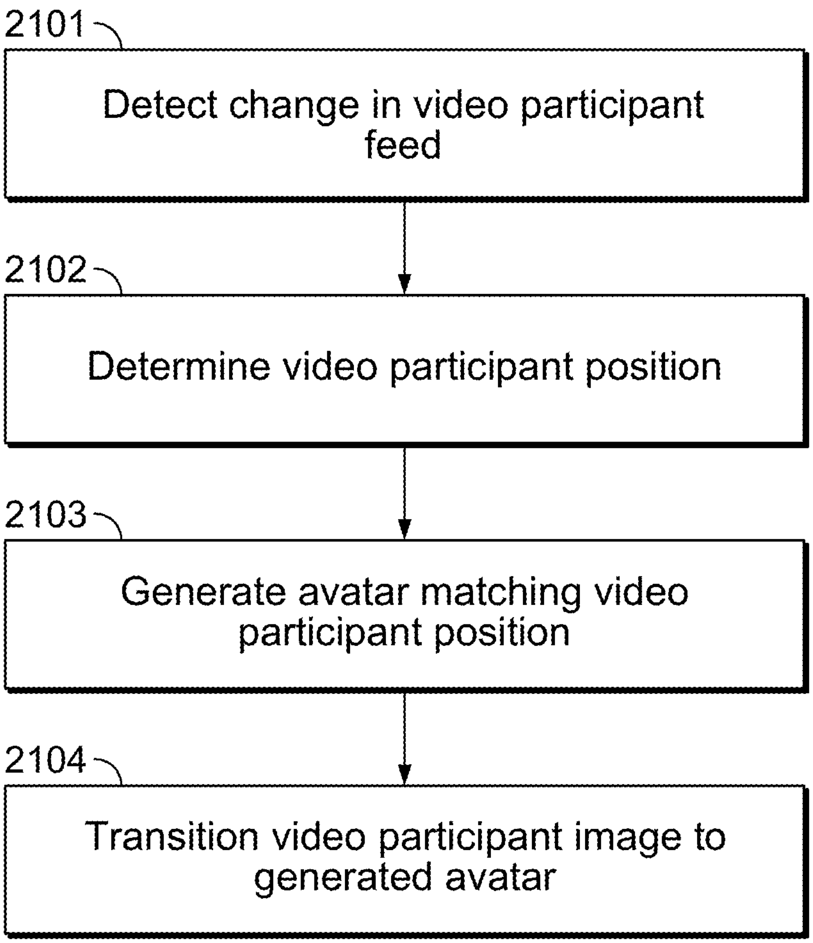
FIG. 21 an example process of transitioning a participant representation between a live feed and an avatar in accordance with the present description.

FIG. 21 shows an example process of transitioning a participant representation between a live feed and an avatar. At step 2101 the video conferencing system 100 detects a change in a video participant feed. The video conferencing system 100 may base this decision on images and/or sound collected and received from a user device such a live feed. The video conferencing system 100 may further incorporate machine learning models such as machine learning model 202 to analyze received data. The video conferencing system 100 may also use a processor such as processor 204 to make the determination using the received data and machine learning analysis. At step 2102 the video conferencing system 100 may determine the position of the video participant. For example, the video conferencing system 100 may rely on image recognition or machine learning software to determine an outline of the participant in a display window. At step 2103 the video conferencing system 100 may generate an avatar matching the video participant position, by, for example, positioning an avatar to match the participant's position. At step 2104 the video conferencing system 100 may transition the video participant image or other representation to the generated avatar. This transition may be gradual, such as a fade, or abrupt. In embodiments in which the avatar is an image or loop of the participant, for example, an abrupt transition may be subtle nonetheless.

Figure 22:
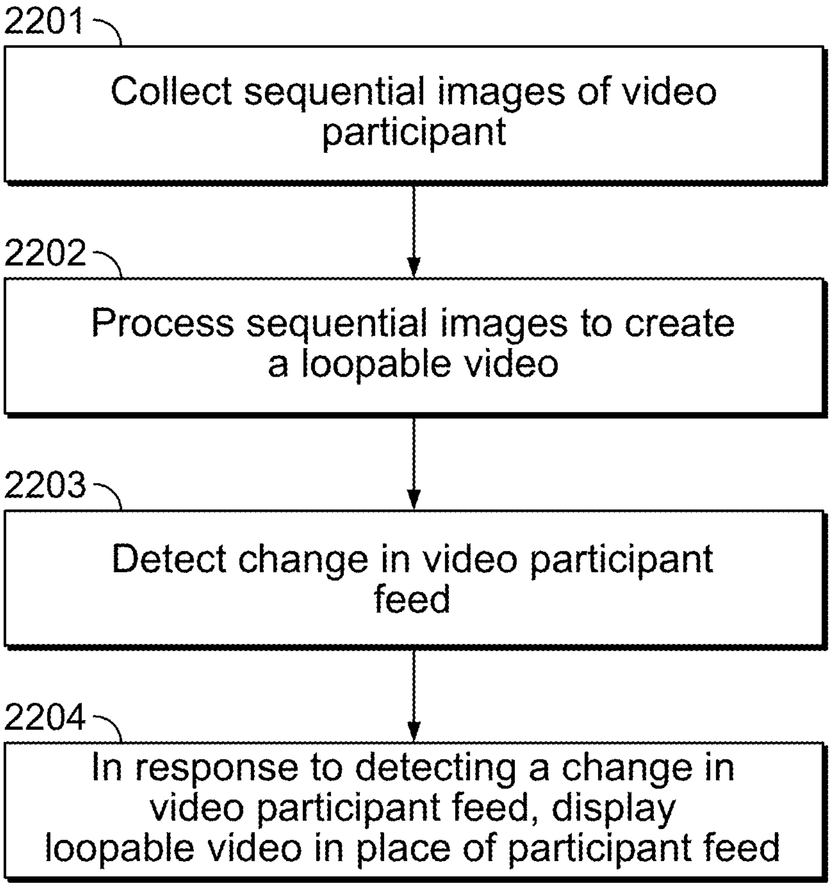
FIG. 22 shows an example process of replacing a live feed of a video conference participant with a loopable video of the participant in accordance with the present description.

FIG. 22 shows an example process of replacing a live feed of a video conference participant with a loopable video of the participant in accordance with one embodiment of the disclosure. Initially, at step 2201 the video conferencing system 100 collects sequential images of the participant from the video feed. For example, the video conferencing system 100 may remove audio from a given amount of time on a video feed, leaving on a series of images of the participant. In this situation, the series of images represent fluid movement over many frames. The video conferencing system 100 then processes the sequential images to create a loopable video at step 2202. Processing may include formatting the images. It may also include generating a video from the images which show the participant in the movements captured and adding to that generated video the same images in reverse order such that the final video shows the participant in movement and then reversing the movement to return to the same position in the last frame of the final video as in the first frame of the final video. The video conferencing system 100 then monitors the participant's actions and, detects a change in the participant's video feed. In some embodiments the detected change is an unwanted action or behavior such as the participant stepping away or blowing a nose. The video conferencing system 100 may rely on machine learning models and computer vision algorithm to detect and/or recognize certain actions. In response to detecting a change in the video participant's feed, the video conferencing system 100 generates for display a loopable video in place of the participant's live feed to other participants or viewers of the video conference.

Figure 23:
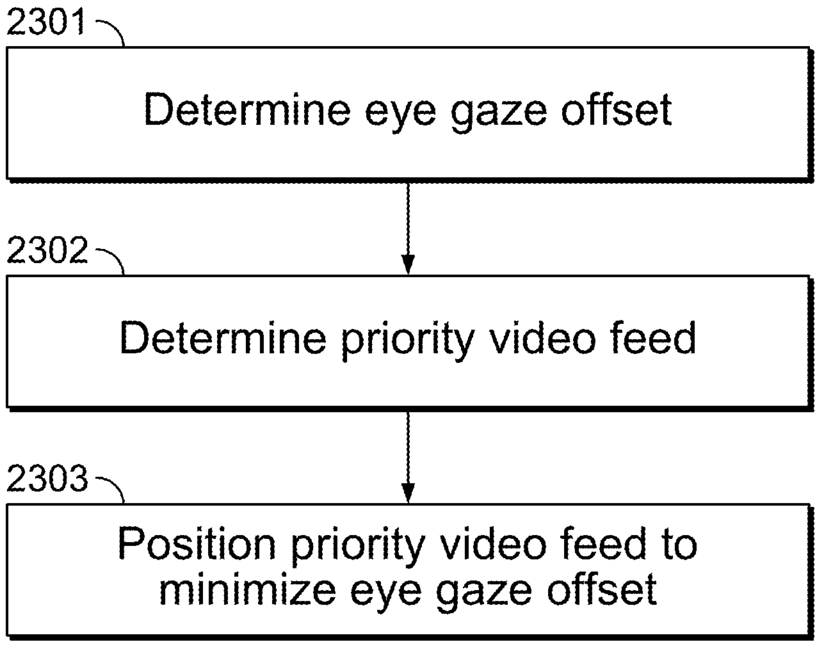
FIG. 23 shows an example process of adapting video feed arrangement in a video conference in accordance with the present description.

FIG. 23 shows an example process of adapting video feed arrangement in a video conference display interface to optimally offset eye gaze in accordance with one embodiment of the disclosure. At step 2301 the video conferencing system 100 determines an eye gaze offset. The offset may be due to the placement of a camera capturing a participant in a video feed. The eye gaze offset may involve determining, based on an analysis of images of the participant, a position of the camera, a position of the display the participant gazes at, and a position of the participant. At step 2302 the video conferencing system 2302 determines a priority for one or more video feeds of the video conference. In some embodiments, the video conferencing system 100 prioritizes a video feed based on the engagement of a participant associated with the video feed. At step 2303, the video conferencing system 100 positions one or more prioritized video feeds to minimize eye gaze offset. For example, the video conferencing system 100 may position a priority video feed closest to the camera such that the eye gaze is directed toward the camera, causing the images of a participant to mimic eye contact.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any embodiment may be applied to any other embodiment herein, and flowcharts or examples relating to an embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving conference feeds for each of a plurality of participants;

determining, based at least in part on historical interaction data for one or more participants of the plurality of participants, an interaction score for the one or more participants of the plurality of participants, wherein the interaction score comprises a likelihood of interaction between a first participant and a second participant of the plurality of participants based at least in part on based on the historical interaction data;

generating, based at least in part on the determined interaction score, a first arrangement of representations of the conference feeds in a user interface, wherein the first arrangement positions a representation of the first participant adjacent to a representation of a second participant of the plurality of participants according to the interaction score for the first participant indicating the likelihood of interaction between the first participant and the second participant based at least in part on based on the historical interaction data; and providing for presentation in the user interface the first arrangement of the conference feeds.

2. The method of claim 1, further comprising:

determining new interaction data based on the conference feeds for each of the plurality of participants;

updating, based on the new interaction data, the interaction score for the one or more participants of the plurality of participants;

generating, based on the updated interaction score, a second arrangement of the conference feeds in the user interface different from the first arrangement of the conference feeds; and providing for presentation in the user interface the second arrangement of the conference feeds.

3. The method of claim 2, wherein the new interaction data is a participant speaking.

4. The method of claim 2, wherein the new interaction data is a conversation between a first and second participant, and generating, based on the updated interaction score, a second arrangement of representations of the conference feeds in the user interface different from the first arrangement of representations of the conference feeds comprises positioning a representation of the conference feed of the first participant adjacent to a representation of the conference feed of the second participant.

5. The method of claim 2, wherein the new interaction data is a display of presentation material.

6. The method of claim 1, wherein generating, based on the determined interaction score, a first arrangement of the conference feeds in a user interface comprises changing sizes of the representations of the conference feeds based on the interaction score.

7. The method of claim 1, wherein generating, based on the determined interaction score, a first arrangement of the conference feeds in a user interface comprises changing positions of the representations of the conference feeds based on the interaction score.

8. The method of claim 1, further comprising:

determining an eye gaze offset of a participant; and wherein generating, based on the determined interaction score, a first arrangement of representations of the conference feeds in a user interface is further based at least in part on the determined eye gaze offset.

9. The method of claim 8, further comprising generating, based on the determined interaction score and the eye gaze offset, a first arrangement of representations of the conference feeds in a user interface that maximizes perceived eye contact in a representation of the conference feed of the participant.

10. The method of claim 8, wherein determining the eye gaze offset includes determining a position of a camera relative to the eye gaze.

11. The method of claim 2, wherein generating, based on the updated interaction score, a second arrangement of representations of the conference feeds in the user interface different from the first arrangement of representations of the conference feeds occurs before initiation of the conference feed.

12. A system comprising:

memory;

control circuitry configured to:

receive conference feeds for each of a plurality of participants;

determine, based at least in part on historical interaction data for one or more participants of the plurality of participants stored in the memory, an interaction score for the one or more participants of the plurality of participants, wherein the interaction score comprises a likelihood of interaction between a first participant and a second participant of the plurality of participants based at least in part on the historical interaction data;

generate, based on the determined interaction score, a first arrangement of representations of the conference feeds in a user interface; wherein the first arrangement positions a representation of the first participant adjacent to a representation of a second participant of the plurality of participants according to the interaction score for the first participant indicating the likelihood of interaction between the first participant and the second participant based at least in part on the historical interaction data; and provide for presentation in the user interface the first arrangement of the conference feeds.

13. The system of claim 12, wherein the control circuitry is further configured to:

determine new interaction data based on the conference feeds for each of the plurality of participants;

update, based on the new interaction data, the interaction score for the one or more participants of the plurality of participants;

generate, based on the updated interaction score, a second arrangement of the conference feeds in the user interface different from the first arrangement of the conference feeds; and provide for presentation in the user interface the second arrangement of the conference feeds.

14. The system of claim 13, wherein:

the new interaction data is a conversation between a first and second participant; and the control circuitry is configured to generate, based on the updated interaction score, a second arrangement of representations of the conference feeds in the user interface different from the first arrangement of representations of the conference feeds by positioning a representation of the conference feed of the first participant adjacent to a representation of the conference feed of the second participant.

15. The system of claim 13, wherein the new interaction data is a participant speaking.

16. The system of claim 12, wherein the control circuitry is configured to generate, based on the determined interaction score, a first arrangement of the conference feeds in a user interface by changing sizes of the representations of the conference feeds based on the interaction score.

17. The system of claim 12, wherein the control circuitry is configured to generate, based on the determined interaction score, a first arrangement of the conference feeds in a user interface by changing positions of the representations of the conference feeds based on the interaction score.

18. The system of claim 12, wherein to determine an eye gaze offset includes determining a position of a camera relative to the eye gaze.

19. The system of claim 18, wherein the control circuitry is further configured to: determine the eye gaze offset of a participant; and wherein the control circuitry is configured to generate, based on the determined interaction score, a first arrangement of representations of the conference feeds in a user interface based on the on determined eye gaze off set.

20. The system of claim 19, wherein the control circuitry is further configured to generate, based on the determined interaction score and eye gaze offset, a first arrangement of representations of the conference feeds in a user interface that maximizes perceived eye contact in a representation of the conference feed of the participant.

* * * * *